(12) United States Patent
Kadono et al.

(10) Patent No.: US 7,693,217 B2
(45) Date of Patent: Apr. 6, 2010

(54) MOVING PICTURE CODING METHOD AND MOVING PICTURE DECODING METHOD

(75) Inventors: Shinya Kadono, Nishinomiya (JP); Satoshi Kondo, Yawata (JP); Makoto Hagai, Moriguchi (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 11/979,021

(22) Filed: Oct. 30, 2007

(65) Prior Publication Data

US 2008/0075167 A1 Mar. 27, 2008

Related U.S. Application Data

(60) Continuation of application No. 11/598,635, filed on Nov. 14, 2006, now Pat. No. 7,526,026, which is a division of application No. 10/432,872, filed as application No. PCT/JP02/10246 on Oct. 2, 2002, now Pat. No. 7,209,520.

(30) Foreign Application Priority Data

Oct. 17, 2001 (JP) ............... 2001-319002

(51) Int. Cl.
*H04N 7/12* (2006.01)
(52) U.S. Cl. ............... 375/240.13; 375/240.27; 375/240.29; 375/240.14; 375/240.12; 386/68
(58) Field of Classification Search ......... 375/240.12, 375/240.13, 240.14, 240.27, 240.23; 386/68
See application file for complete search history.

(56) References Cited

U.S. PATENT DOCUMENTS

| 5,132,792 | A | * | 7/1992 | Yonemitsu et al. ..... 375/240.16 |
| 5,317,397 | A | | 5/1994 | Odaka et al. |
| 5,323,188 | A | | 6/1994 | Kawayachi et al. |
| 5,412,430 | A | | 5/1995 | Nagata |
| 5,543,847 | A | * | 8/1996 | Kato ............... 375/240.15 |
| 6,049,570 | A | * | 4/2000 | Fukunaga et al. ...... 375/240.12 |

(Continued)

FOREIGN PATENT DOCUMENTS

CN 1195236 10/1998

(Continued)

OTHER PUBLICATIONS

International Standard, Information technology—Generic coding of moving pictures and associated audio information: Video, Dec. 15, 2000, p. vii, Intro 4.1.1, ISO/IEC 13818-2.

(Continued)

*Primary Examiner*—Thai Tran
*Assistant Examiner*—Jamie J Atala
(74) *Attorney, Agent, or Firm*—Wenderoth, Lind & Ponack, L.L.P.

(57) ABSTRACT

A moving picture coding apparatus 1 includes a counter unit 102 which counts the number of pictures following an intra coded picture; and a motion estimation unit 101 which compares respectively only reference pictures which are the intra coded picture or the following pictures, selected from among a reference picture Ref1, a reference picture Ref2 and a reference picture Ref3 stored in memories 408~410, with a picture signal Vin, and determines the reference picture whose inter picture differential value is smallest.

1 Claim, 17 Drawing Sheets

U.S. PATENT DOCUMENTS

| | | | |
|---|---|---|---|
| 6,222,886 | B1* | 4/2001 | Yogeshwar ............ 375/240.23 |
| 6,363,212 | B1* | 3/2002 | Fujinami et al. ............ 386/104 |
| 6,414,999 | B1* | 7/2002 | Igi et al. ................ 375/240.26 |
| 6,621,979 | B1* | 9/2003 | Eerenberg et al. ............. 386/68 |
| 6,785,338 | B1* | 8/2004 | Reitmeier et al. ...... 375/240.29 |
| 7,209,520 | B2* | 4/2007 | Kadono et al. ......... 375/240.13 |
| 7,580,459 | B2* | 8/2009 | Kadono et al. ......... 375/240.13 |
| 2001/0014178 | A1 | 8/2001 | Boon |

FOREIGN PATENT DOCUMENTS

| | | |
|---|---|---|
| EP | 0 526 163 | 2/1993 |
| EP | 0 851 685 | 7/1998 |
| EP | 0 871 336 | 10/1998 |
| JP | 62-61485 | 3/1987 |
| JP | 4-127689 | 4/1992 |
| JP | 4-268892 | 9/1992 |
| JP | 5-37915 | 2/1993 |
| JP | 5-41861 | 2/1993 |
| JP | 5-83700 | 4/1993 |
| JP | 6-339132 | 12/1994 |
| JP | 09-051533 | 2/1997 |
| JP | 09-093554 | 4/1997 |
| JP | 10-191356 | 7/1998 |
| JP | 11-004448 | 1/1999 |
| JP | 11-341435 | 12/1999 |
| JP | 11-341436 | 12/1999 |
| JP | 2000-156868 | 6/2000 |
| JP | 2001-268581 | 9/2001 |

OTHER PUBLICATIONS

Hannuksela, M. M. et al: "Random Access and Time Information" Joint Video Team (JVT) of ISO/IEC MPEG & ITU-T VCEG (ISO/IEC JTC1/SC29/WG11 and ITU-T SG16 Q6), Mar. 1, 2002, pp. 1-6, XP002264576.

Stockhammer, T: "Error Robust Macroblock Mode and Reference Frame Selection (Document VT.B102d1.doc)" Joint Video Team (JVT) of ISO/IEC MPEG & ITU-T VCEG (ISO/IEC JTC1/SC29/WG11 and ITU-T SG16 Q6), Jan. 29, 2002, pp. 1-6, XP002243591.

Sullivan, G: "Draft Text of Recommendation H.263 Version 2(H. 263+) for Decision" ITU-T Draft Recommendation H.263 Version 2, Jan. 27, 1998, pp. i-v, 1-144, XP000982914.

Tomita, Y. et al: "Error resilient modified inter-frame coding system for limited reference picture memories" Picture Coding Symposium, PCS 97, ITG-Fachberichte VDE-Verlag Germany, No. 143, Sep. 10, 1997, pp. 743-748, XP002347340.

Wiegand, T: "Modification of Annex U for Enhanced Error Resilience + Annex U" ITU Telecommunications Standardization Sector, Study Group 16, Video Coding Experts Group (Question 15), Q15J33, Mar. 13, 2000, pp. 1-17, XP002183258.

Wiegand, T. and Nielsson, M: "Annex U including Picture Numbers" ITU Telecommunications Standardization Sector, Study Group 16, Video Coding Experts Group (Question 15), Q15J66, May 20, 2000, pp. 1-10, XP002385833.

Sullivan, G: "Draft for H.263++ Annexes U, V and W to Recommendation H.263" ITU-T H.263++ Draft for H.263++ Annexes U, V and W to Recommendation H.263, XX, XX, Nov. 2000, pp. 1-46, XP000986538.

"ISO/IEC CD 13818-2: Information Technology—Generic Coding of Moving Pictures and Associated Audio Information Part 2: Video" International Standard—ISO, Zuerich, CH, No. 659, Dec. 1, 1993, pp. I-VII, 1-179, XP000567291.

Zhang, K. et al: "Using scene-change detection and multiple-thread background memory for efficient video coding" Electronics Letters, IEE Stevenage, GB, vol. 35, No. 4, Feb. 18, 1999, pp. 290-291, XP006011823.

Office Action issued Oct. 28, 2008 in U.S. Appl. No. 11/598,741.

* cited by examiner

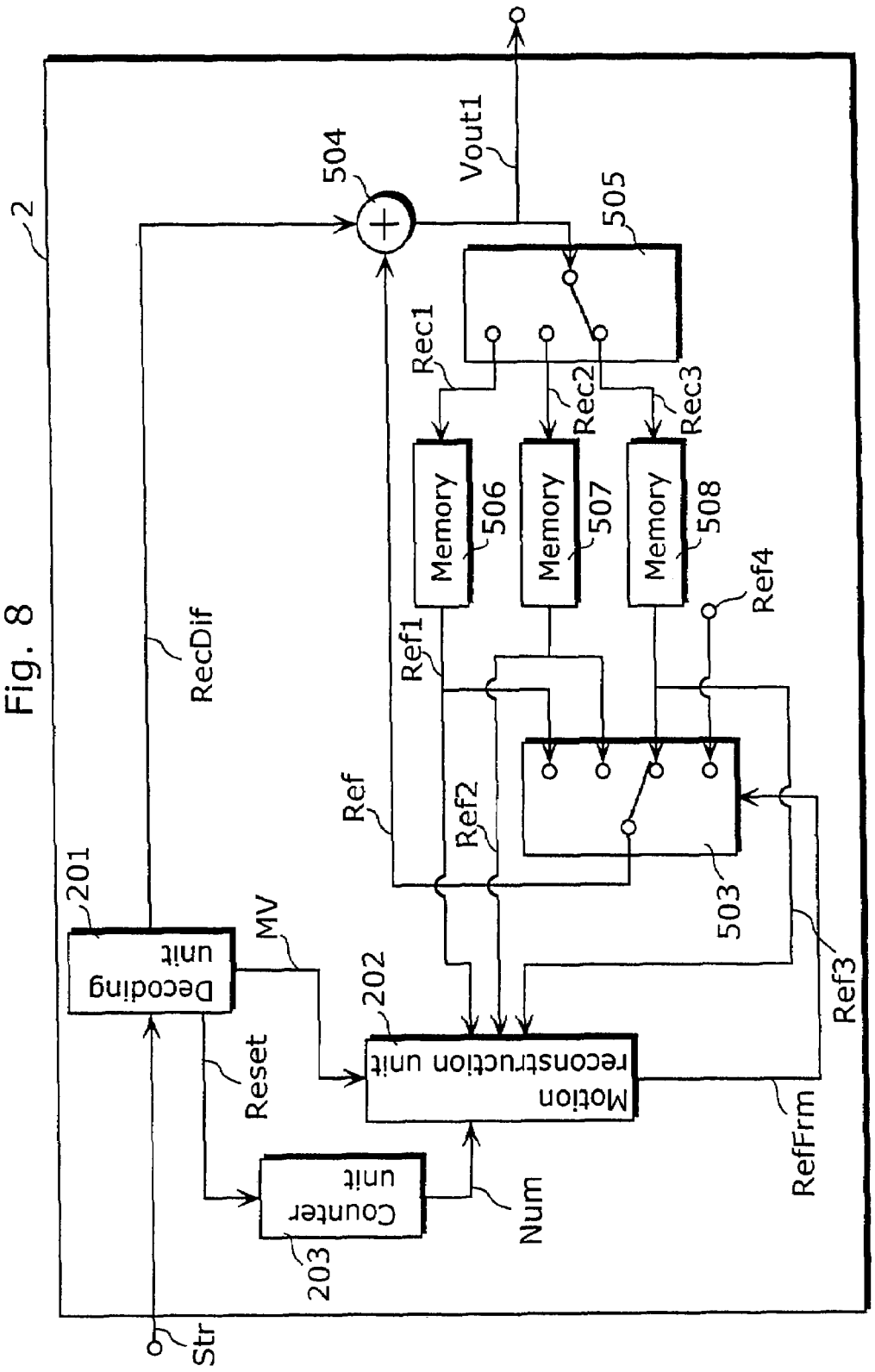

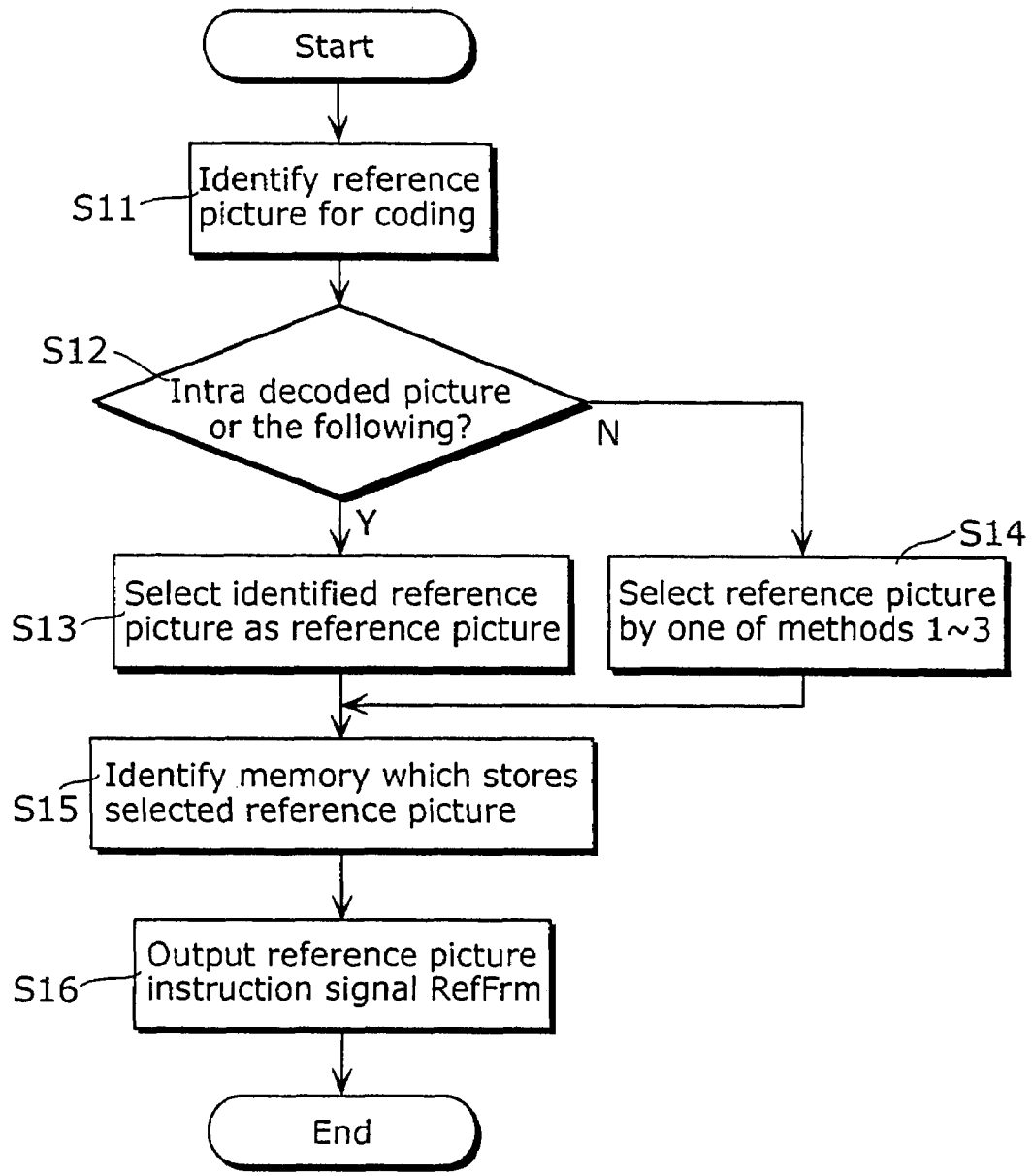

| | Reference picture used for decoding | Example |
|---|---|---|
| Method 1 | Picture identified based on motion information MV | $P_1$ |
| Method 2 | Intra decoded picture | $P_2$ |
| Method 3 | Picture decoded most recently | $P_3$ |

| $P_1$ | $P_2$ | $P_3$ | $P_4$ |
|---|---|---|---|
| Inter Picture | Intra Picture | Inter Picture | Inter Picture |

MOVING PICTURE CODING METHOD AND MOVING PICTURE DECODING METHOD

This application is a continuation of application Ser. No. 11/598,635, filed Nov. 14, 2006 now U.S. Pat. No. 7,526,026, which is a divisional of application Ser. No. 10/432,872 filed May 28, 2003, now U.S. Pat. No. 7,209,520, which is the National Stage of International Application No. PCT/JP02/10246, filed Oct. 2, 2002.

TECHNICAL FIELD

The present invention relates to a moving picture coding method, a moving picture coding apparatus, a moving picture decoding method and a moving picture decoding apparatus for coding or decoding a moving picture signal with reference to a plurality of coded pictures or decoded pictures, and to a recording medium which stores a program for executing such coding or decoding in the form of software.

BACKGROUND ART

In the age of multimedia which integrally handles audio, video and other information such as pixel values, existing information media, i.e., newspapers, magazines, televisions, radios, telephones and other means through which information is conveyed to people, have recently come to be included in the scope of multimedia. Generally, multimedia refers to something that is represented by associating not only characters, but also graphics, voices, and especially pictures and the like together, but in order to include the aforementioned existing information media in the scope of multimedia, it appears as a prerequisite to represent such information in digital form.

However, when calculating the amount of information contained in each of the aforementioned information media as the amount of digital information, while the amount of information per character is 1~2 bytes, the amount of information to be required for voice is 64 Kbits or over per second (telephone quality), and 100 Mbits or over per second for moving pictures (current television reception quality), and it is not realistic for the aforementioned information media to handle such an enormous amount of information as it is in digital form. For example, although video phones are already in the actual use via Integrated Services Digital Network (ISDN) which offers a transmission speed of 64 Kbps~1.5 Mbps, it is not practical to transmit video information shot by television cameras directly through ISDN.

Against this backdrop, information compression techniques have become required, and moving picture compression techniques compliant with H.261 and H.263 standards recommended by ITU-T (International Telecommunication Union-Telecommunication Standardization Sector) are employed for video phones, for example. Moreover, according to Information compression techniques compliant with the MPEG-1 standard, it is possible to store picture information in an ordinary music CD (compact disc) together with sound information.

Here, MPEG (Moving Picture Experts Group) is an international standard on digital compression of moving picture signals, and MPEG-1 is a standard for compressing television signal Information approximately into one hundredth so that moving picture signals can be transmitted at a rate of 1.5 Mbps. Furthermore, since transmission speed within the scope of the MPEG-1 standard is limited primarily to about 1.5 Mbps, MPEG-2, which was standardized with a view to satisfy requirements for further improved picture quality, allows data transmission of moving picture signals at a rate of 2~1.5 Mbps.

Furthermore, MPEG-4 which provides a higher compression ratio has been standardized by the working group (ISO/IEC JTC1/SC29/WG11) which was engaged in the standardization of MPEG-1 and MPEG-2. Not only is it possible to perform a highly efficient coding at a low bit rate, MPEG-4 employs a powerful technique for error resilience which lessens the degradation of picture quality to be judged from a subjective standpoint, even when a transmission channel error occurs. Also, ITU-T has started work for standardization of H.26L as a next-generation picture coding method.

MPEG-1, MPEG-2 and MPEG-4 have allowed substantial improvement of compression ratio using inter predictive picture coding (hereinafter referred to as inter picture coding) for coding or decoding a differential value between a current picture to be coded or decoded and a reference picture (a picture signal of a picture which has been coded or decoded most recently) with reference to the reference picture (See, for example, ISO/IEC 13818-2 "INTERNATIONAL STANDARD Information technology—Generic coding of moving pictures and associated audio information: Video", Dec. 15, 2000, p. 7, Intro. 4.1.1).

In addition, compression of the amount of information can be realized by reducing redundancies in the temporal and spatial directions. In the inter predictive picture coding which aims at reducing the temporal redundancies, a predictive picture is created with reference to previously coded or decoded pictures (reference pictures) and the differential value between the resulting predictive picture and a current picture to be coded is coded. Here, a picture is a term representing one sheet of an image, and specifically, a picture means a frame in a progressive image and a frame or a field in an interlace image.

As of September, 2001, the proposed H.26L standard allows not only reference only to a picture which has been coded or decoded immediately before a current picture to be coded or decoded, but also reference to an arbitrary picture selected, as a reference picture, from a plurality of pictures which have been coded or decoded prior to the current picture.

FIG. 1 shows an illustration of a concept of a conventional moving picture coding method and a moving picture decoding method. FIG. 1 is an example in which an arbitrary picture is selected as a reference picture from 3 pictures preceding a current picture to be coded or decoded. In FIG. 1, pictures are ordered in display order, and the display time of the picture at the far left is earliest. The pictures are also coded in this order from the left. Therefore, in a bit stream, the pictures are also ordered in the order of Picture $J_1$, Picture $J_2$, Picture $J_3$ and Picture $J_4$. When a current picture to be coded or decoded is Picture $J_4$, it is possible to select one of these Picture $J_1$, Picture $J_2$ and Picture $J_3$ as a reference picture, and when a current picture to be coded or decoded is Picture $J_5$, it is possible to select one of these Picture $J_2$, Picture $J_3$ and Picture $J_4$ as a reference picture.

FIG. 2 is a block diagram showing the structure of a conventional moving picture coding apparatus.

A moving picture coding apparatus 4 is an apparatus for compressing and coding an inputted picture signal Vin so as to output a coded picture signal Str in the form of a bit stream transformed by variable length coding or the like, and is comprised of a motion estimation unit 401; a selection unit 402, a picture signal subtraction unit 403, a coding unit 404, a decoding unit 405, an addition unit 406, a selection unit 407 and memories 408~410.

The motion estimation unit 401 reads out previously coded reference pictures which are stored in the memories 408~410 respectively and compare them with the inputted picture signal Vin so as to determine motion information MV indicating the reference picture Ref whose inter picture differential value (error energy) is smaller and the pixel location for making the inter picture differential value smaller. The reference picture Ref and the pixel location for making the error energy smallest is usually determined, but recently a method has been used for determining the motion information. MV not just for making the error energy smallest but for making the error energy smaller and making the compression ratio larger. Note that the information of the reference picture Ref and the pixel location is hereinafter referred to as motion Information MV collectively. The selection unit 402 outputs the reference picture selected from among a reference picture Ref1, a reference picture Ref2 and a reference picture Ref3 which are stored in the memories 408~410, based on a reference picture instruction signal RefFrm that is a switching instruction signal. The subtraction unit 403 calculates a differential picture signal Dif between a picture signal Vin and a reference picture Ref.

The coding unit 404 codes the differential picture signal Dif and the motion information MV that is the information for identifying a reference picture. The decoding unit 405 decodes coded data Coded which has been coded by the coding unit 404 to obtain a reconstructed differential picture signal RecDif. The addition unit 406 adds the reference picture Ref and the reconstructed differential picture signal RecDif. The selection unit 407 outputs the inputted decoded picture signal Recon to any of the memories 408~410 as a decoded picture signal Rec1, a decoded picture signal Rec2 or a decoded picture signal Rec3, so as to enable the decoded picture signal to be referred to for coding the following pictures.

Next, the operation of the moving picture coding apparatus structured as above will be explained.

The picture signal Vin is inputted to the picture signal subtraction unit 403 and the motion estimation unit 401. The motion estimation unit 401 reads out the reference picture Ref1, the reference picture Ref2 and the reference picture Ref3 which are previously decoded pictures stored in the memories 408~410, compares them with the inputted picture signal Vin so as to determine a reference picture whose inter picture differential value is smallest, and outputs the motion information MV that is the Information for identifying the reference picture an the pixel location to be referred to.

At the same time, the motion estimation unit 401 outputs a reference picture instruction signal RefFrm that is a switching instruction signal so that the selection unit 402 can select a reference picture corresponding to the motion information MV and output it as a reference picture Ref. Note that since a scene change or the like causes a loss of correlation between the pictures, the compression ratio of an inter coded picture could decline more than an intra coded picture (or an intra picture) which can be reconstructed only with a coded picture signal of a picture to be coded. In this case, the motion estimation unit 401 indicates the intra picture coding by the motion information MV and outputs a reference picture instruction signal RefFrm for outputting a reference picture Ref4 which always outputs a value 0 as a reference picture Ref. Note that the value of the reference picture Ref4 does not always need to be 0 and may be an average value 128 in the case of a luminance signal or an RGB color signal whose value is 0~255, for example.

Also, in order to prevent error propagation or enable reproduction to start from a picture at some midpoint in a coded picture signal, a picture in every predetermined number of pictures needs to be intra coded so as to be reconstructed only with a coded picture signal of a picture to be coded. So, the motion estimation unit 401 can switch into the intra picture coding forcibly according to the instruction of an intra picture coding instruction signal Reset given from outside.

On the other hand, the subtraction unit 403 calculates the difference between this picture signal Vin and the reference picture Ref selected by the selection unit 402, and outputs the differential picture signal Dif to the coding unit 404. Next, the coding unit 404 codes the differential picture signal Dif and the motion information MV outputted from the motion estimation unit 401, and outputs the coded picture signal Str and the coded data Coded. Here, the coded data Coded is data necessary for reconstructing a picture, and the coded picture signal Str is a bit stream of the coded data Coded transformed by variable length coding or the like.

The decoding unit 405 decodes the coded data Coded and outputs the reconstructed differential picture signal RecDif to the addition unit 406. The addition unit 406 adds the reconstructed differential picture signal RecDif and the reference picture Ref selected by the selection unit 402, and outputs the decoded picture signal Recon to the selection unit 407. The selection unit 407 outputs the decoded picture signal Recon to any of the memories 408~410 as a decoded picture signal Rec1, a decoded picture signal Rec2 or a decoded picture signal Rec3 so that the decoded picture signal Recon can be referred to as a reference picture for coding the following pictures. In this example, the selection unit 407 switches the memories so that the picture which has been stored in any of these memories at the earliest time is overwritten by a new decoded picture signal Recon.

FIG. 3 is a block diagram showing the structure of a conventional moving picture decoding apparatus.

A moving picture decoding apparatus 5 is an apparatus for decoding a coded picture signal Str which has been coded by the moving picture coding apparatus 4.

A decoding unit 501 decodes the inputted coded picture signal Str and outputs a reconstructed differential picture signal RecDif and motion information MV. A motion reconstruction unit 502 decodes the motion information MV and outputs a reference picture instruction signal RefFrm. Operations of a selection unit 503, a selection unit 505 and memories 506~508 are same as those of the selection unit 402, the selection unit 407 and the memories 408~410 of the moving picture coding apparatus 4 as shown in FIG. 2. The addition unit 504 adds the reconstructed differential picture signal RecDif and the reference picture Ref to output a decoded picture signal Vout (which corresponds to a decoded picture signal Recon in FIG. 2).

Note that in the above-mentioned moving picture coding apparatus 4 and the moving picture decoding apparatus 5, motion compensation units not shown in the figures are provided on the output sides of the selection unit 402 and the selection unit 503, respectively, and perform motion compensation for generating pixel values with pixel location precision in decimal degree which are pixel values with ½ pixel location precision or the like for interpolating the pixel values of the reference picture outputted from the memory.

By the way, in the above-mentioned conventional moving picture coding apparatus and moving picture decoding apparatus, it is not distinguished at all whether the reference picture is an intra coded picture or one of inter coded pictures following the intra coded picture. For example, in the illustration of FIG. 1 explaining the concept of the conventional moving picture coding method and moving picture decoding method, Picture $J_2$ is an intra coded picture and Picture $J_1$, Picture $J_3$, Picture $J_4$ and Picture $J_5$ are inter coded pictures, but Picture $J_1$ can be referred to as a reference picture for Picture $J_4$. If Picture $J_4$ refers to Picture $J_1$ as a reference picture, it means that Picture $J_4$ refers to, as a reference picture, the picture preceding the intra coded Picture $J_2$.

However, when starting reproduction from a picture at some midpoint, for example, when starting decoding and reproduction from the intra coded Picture $J_2$ at a midpoint in a coded picture signal, the decoding of Picture $J_4$ requires reference to the decoded Picture $J_1$. Therefore, a problem occurs that the pictures following Picture $J_4$ cannot be correctly decoded.

Also, for example, if a stream error occurs at a midpoint in a coded picture signal and Picture $J_1$ cannot be correctly decoded due to the error, a problem occurs that the pictures following Picture $J_4$ cannot be correctly decoded because the decoding of Picture $J_4$ requires reference to Picture $J_1$, although the intra coded Picture $J_2$ can be correctly decoded.

And so, the present invention has been conceived in view of the above-mentioned circumstances, and aims at providing a moving picture coding method, a moving picture decoding method and the like for making it possible to start reproduction from an intra coded picture at a midpoint in a coded picture signal and thus reproduce the pictures following the intra coded picture without error even if a stream error may occur.

DISCLOSURE OF INVENTION

The moving picture coding method according to the present invention is a method for coding a moving picture on a picture by picture basis, the moving picture coding method comprising: a determining step for determining, as a reference picture, one of an intra coded picture and pictures which have been coded following the intra coded picture, from among a plurality of pictures stored in a memory; a coding step for reading out the determined reference picture from the memory, calculating a differential picture signal that is a difference between the read-out reference picture and a picture to be coded, and coding the calculated differential picture signal; and a storing step for decoding the coded differential picture signal, adding the decoded differential picture signal with a picture signal of the reference picture, and storing a resulting picture in the memory.

Also, the moving picture coding method according to the present invention is a method for coding a moving picture on a picture by picture basis, the moving picture coding method comprising: a specifying step for specifying an intra coded picture of a plurality of pictures stored in a memory as a picture which is an anchor for restricting a candidate for a reference picture; and a coding step for coding a signal indicating the picture which is an anchor for restricting a candidate for a reference picture so that a picture to be coded following the picture specified in the specifying step refers only to said specified picture or pictures which have been coded following said specified picture.

In addition, the moving picture coding method according to the present invention is a method for coding a moving picture on a picture by picture basis, the moving picture coding method comprising: a specifying step for specifying an intra coded picture of a plurality of pictures stored in a memory as a picture which is an anchor for restricting a candidate for a reference picture; a step for deleting a picture which has been coded prior to the picture specified in the specifying step; and a coding step for coding a signal indicating that the picture which has been coded prior to the picture specified in the specifying step is deleted so that a picture to be coded following said specified picture refers only to said specified picture or pictures which have been coded following said specified picture.

Further, the moving picture decoding method according to the present invention is a method for decoding a moving picture on a picture by picture basis, the moving picture decoding method comprising: a decoding step for decoding an inputted coded picture signal; a determining step for determining, as a reference picture, one of an intra decoded picture and pictures which have been decoded following the intra decoded picture, from among a plurality of pictures stored in a memory; and a storing step for reading out the determined reference picture from the memory, adding a picture signal of the read-out reference picture with a decoded differential picture signal of a picture to be decoded, and outputting a resulting picture to the outside and storing the resulting picture in the memory.

Also, the moving picture decoding method according to the present invention is a method for decoding a moving picture on a picture by picture basis, the moving picture decoding method comprising: a decoding step for decoding a signal indicating a picture which is an anchor for restricting a candidate for a reference picture which is to be referred to for decoding a picture to be decoded; and a determining step for determining, as a reference picture, only the picture which is an anchor and intra decoded or one of pictures which have been decoded following said picture, when decoding a picture following said picture.

In addition, the moving picture decoding method according to the present invention is a method for decoding a moving picture on a picture by picture basis, the moving picture decoding method comprising: a decoding step for decoding a signal indicating a picture which is an anchor for restricting a candidate for a reference picture which is referred to for decoding a picture to be decoded; a step for deleting a picture which has been decoded prior to the picture which is an anchor and intra decoded; and a determining step for determining, as a reference picture, only the picture which is an anchor and intra decoded or one of pictures which have been decoded following said picture, when decoding a picture following said picture.

The moving picture coding apparatus according to the present invention is a moving picture coding apparatus for coding a moving picture on a picture by picture basis, the moving picture coding apparatus comprising: a determination unit operable to determine, as a reference picture, one of an intra coded picture and pictures which have been coded following the intra coded picture, from among a plurality of pictures stored in a memory; a coding unit operable to read out the determined reference picture from the memory, calculate a differential picture signal that is a difference between the read-out reference picture and a picture to be coded, and code the calculated differential picture signal; and a storage unit operable to decode the coded differential picture signal, add the decoded differential picture signal with a picture signal of the reference picture, and store a resulting picture in the memory.

Also, the moving picture decoding apparatus according to the present invention is a moving picture decoding apparatus for decoding a moving picture on a picture by picture basis, the moving picture decoding apparatus comprising: a decoding unit operable to decode an inputted coded picture signal; a determination unit operable to determine, as a reference picture, one of an intra decoded picture and pictures which have been decoded following the intra decoded picture, from among a plurality of pictures stored in a memory; and a storage unit operable to read out the determined reference picture from the memory, add a picture signal of the read-out reference picture with a decoded differential picture signal of a picture to be decoded, and output a resulting picture to the outside and store the resulting picture in the memory.

Further, the present invention can be realized as a program for causing a computer to execute the steps in the above-mentioned moving picture coding method and the moving picture decoding method, or as stream data which is coded by the above-mentioned moving picture coding method, so as to be distributed via a recording medium such as a CD-ROM or a transmission medium such as a communication network.

For example, it is assumed that the pictures are coded in the order of Picture $J_1$, Picture $J_2$, Picture $J_3$, Picture $J_4$ and Picture $J_5$, Picture $J_2$ is an intra coded picture and Picture $J_1$, Picture $J_3$, Picture $J_4$ and Picture $J_5$ are inter coded pictures. Specifically, their order In a bit stream is Picture $J_1$, Picture $J_2$, Picture $J_3$, Picture $J_4$ and Picture $J_5$.

In this case, in the moving picture coding method and the moving picture decoding method according to the present invention, the following pictures can be selected as reference pictures for inter picture coding and decoding: Picture $J_2$, Picture $J_3$ and Picture $J_4$ can be referred to for coding Picture $J_5$, for example; and Picture $J_2$ and Picture $J_3$ can only be referred to for coding Picture $J_4$ because Picture $J_1$ preceding the intra coded Picture $J_2$ is disabled for reference.

BRIEF DESCRIPTION OF DRAWINGS

FIG. 8 is a block diagram showing a structure of a moving picture decoding apparatus of the first embodiment according to the present invention.

FIG. 9 is a flowchart showing operation of a motion reconstruction unit in the above embodiment.

BEST MODE FOR CARRYING OUT THE INVENTION

The embodiments of the present invention will be explained below with reference to FIG. 4~FIG. 17.

First Embodiment

Figure 2:
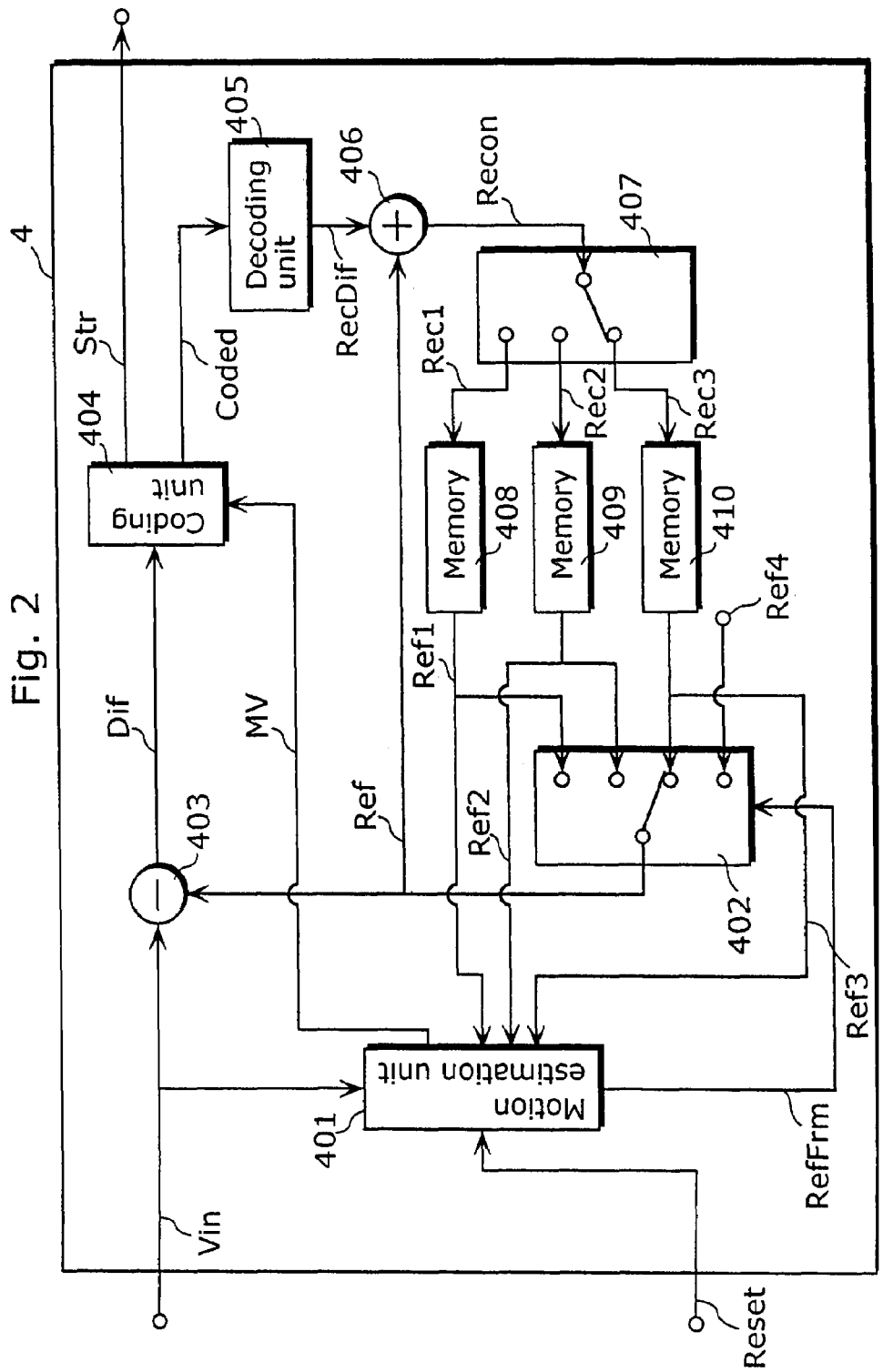
FIG. 2 is a block diagram showing a structure of a conventional moving picture coding apparatus.
Figure 4:
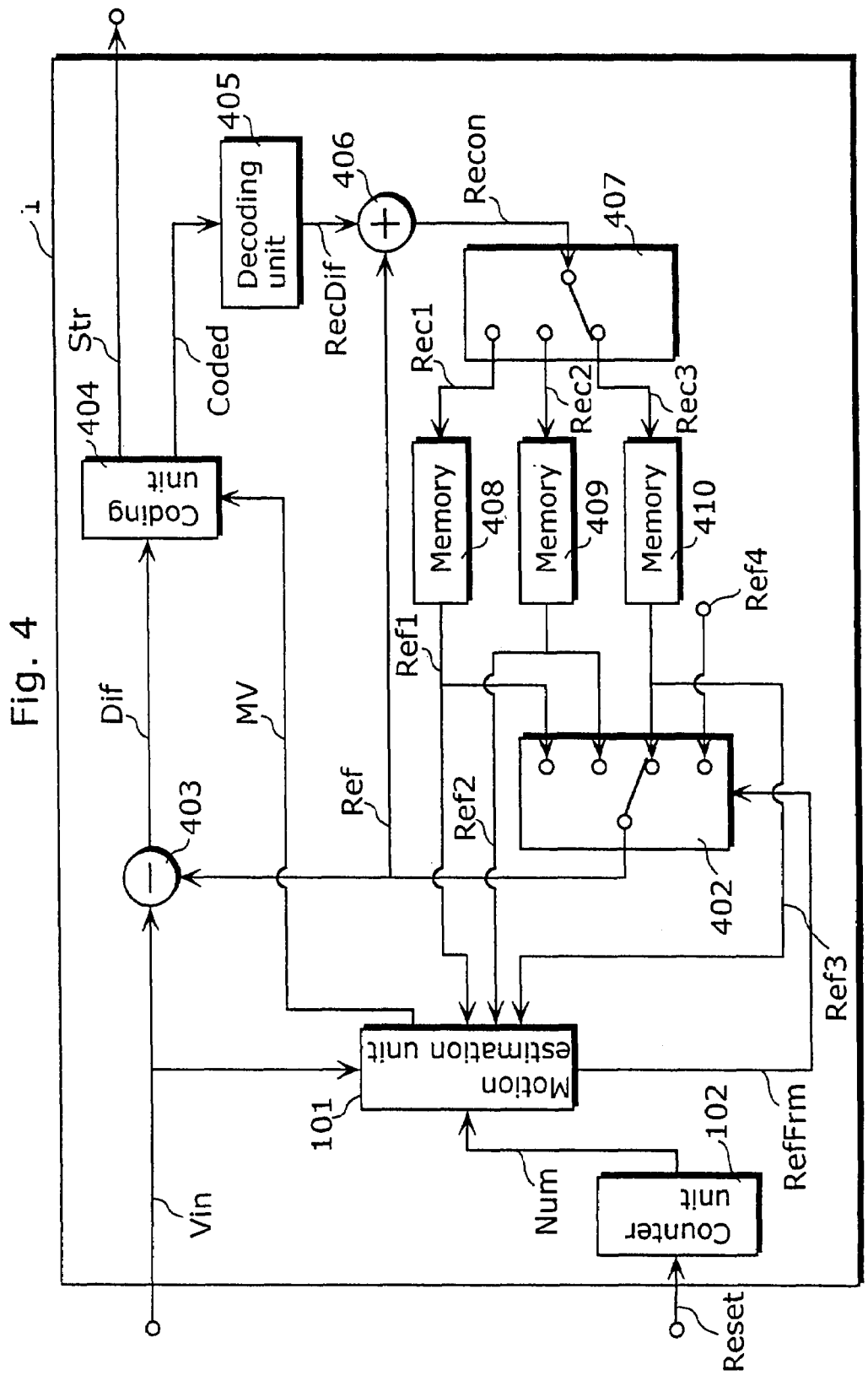
FIG. 4 is a block diagram showing a structure of a moving picture coding apparatus of a first embodiment according to the present invention.

FIG. 4 is a block diagram showing a structure of a moving picture coding apparatus of a first embodiment according to the present invention. Note that the same signs are assigned to the devices which operate in the same manner as the units of the conventional moving picture coding apparatus 4 as shown in FIG. 2.

A moving picture coding apparatus 1 is an apparatus that compresses and codes an inputted picture signal Vin, transforms it into a bit stream by variable length coding or the like and outputs the resulting coded picture signal Str, and is comprised of a motion estimation unit 101, the selection unit 402, the picture signal subtraction unit 403, the coding unit 404, the decoding unit 405, the addition unit 406, the selection unit 407, the memories 408~410 and a counter unit 102.

When receiving the instruction of intra picture coding by an intra picture coding instruction signal Reset inputted from outside, the counter unit 102 start counting the number of pictures following an intra coded picture, and notifies the motion estimation unit 101 of the counting result as the number of potential reference pictures (pictures which can be referred to) Num.

The motion estimation unit 101 compares a picture signal Vin with only reference pictures which have been previously coded and decoded intra coded picture and the following pictures from among the reference picture Ref1, the reference picture Ref2 and the reference picture Ref3 which are stored in the memories 408~410, respectively, based on the number of potential reference pictures, and determines motion information MV indicating the reference picture Ref whose inter picture differential value (error energy) is smaller and the pixel location for making the inter picture differential value smaller. Note that the reference picture Ref and the pixel location for making the error energy smallest is usually determined, but the motion information MV may be determined for not just for making the error energy smallest, but for making the error energy smaller and making the compression ratio larger. A reference picture instruction signal RefFrm is outputted to the selection unit 402 in order to indicate the reference picture Ref.

The selection unit 402 outputs the reference picture Ref selected from among the reference picture Ref1, the reference picture Ref2 and the reference picture Ref3 which are stored in the memories 408~410, based on a reference picture instruction signal RefFrm that is a switching instruction signal.

The subtraction unit 403 calculates a differential picture signal Dif between the picture signal Vin and the reference picture Ref. The coding unit 404 codes the differential picture signal Dif and the motion information MV that is the information for identifying a reference picture, and outputs a coded picture signal Str and coded data Coded. Here, the coded data Coded is the data necessary for reconstructing a picture (data obtained by coding the motion information MV and the differential picture signal Dif), and the coded picture signal Str is a bit stream obtained by further transforming the coded data Coded by variable length coding or the like.

The decoding unit 405 decodes coded data Coded to obtain a reconstructed differential picture signal RecDif. The addition unit 406 adds the reference picture Ref and the reconstructed differential picture signal RecDif. The selection unit 407 outputs the inputted decoded picture signal Recon to any of the memories 408~410 as a decoded picture signal Rec1, a decoded picture signal Rec2 or a decoded picture signal Rec3, so that the decoded picture signal Recon can be referred to as a reference picture for coding the following pictures. In the present embodiment, the selection unit 407 switches the memories so that the decoded picture signal stored in the memory at the earliest time is overwritten by a new decoded picture signal Recon.

Next, the operation of the moving picture coding apparatus structured as above will be explained.

Figure 5:
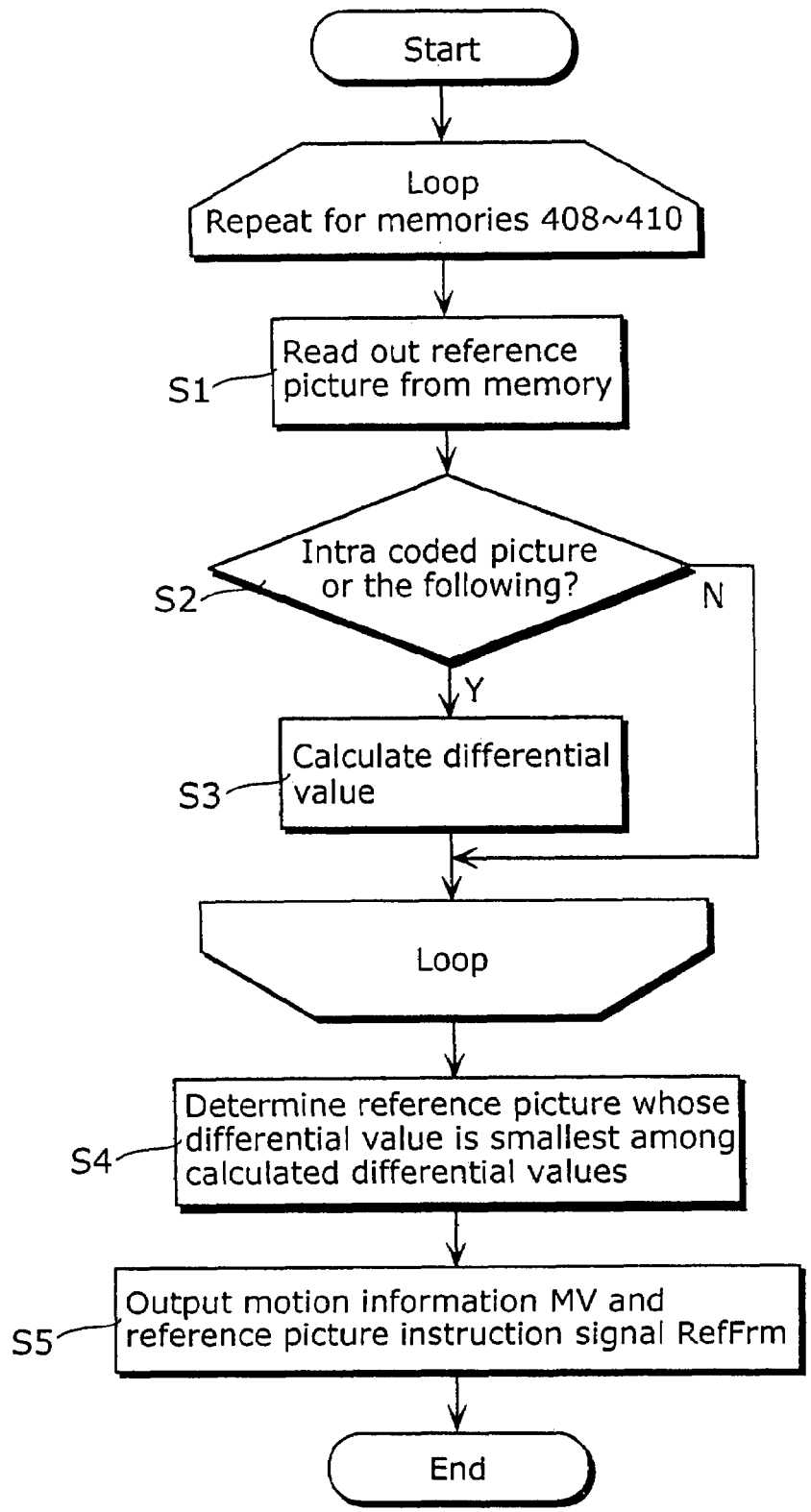
FIG. 5 is a flowchart showing operation of a motion estimation unit in the above embodiment.

FIG. 5 is a flowchart showing the operation of the motion estimation unit 101.

The picture signal Vin is inputted to the picture signal subtraction unit 403 and the motion estimation unit 101.

Upon receipt of the picture signal Vin, the motion estimation unit 101 reads out the reference picture Ref1 stored in the memory 408 (Step S1). Next, the motion estimation unit 101 judges whether or not this reference picture Ref1 is an intra coded picture or one of the following pictures. Specifically, it judges using an equation (A), for example, based on the picture number specific to each picture and the number of potential reference pictures which is notified from the counter unit 102 (Step S2). Here, the picture number is an ID number assigned to a coded picture and has the following feature.

Specifically, the picture number of a picture signal Vin is larger by 1 than the picture number of a picture which has been stored most recently among the pictures which have been stored in the memories 408~410 and are to be reference pictures.

$$\text{Picture number of a reference picture} \geq \text{Picture number of Picture signal } Vin - \text{Number of potential reference pictures } Num \quad (A)$$

As a result, when the above equation (A) is satisfied, the motion estimation unit 101 calculates the differential value between the picture signal Vin and the reference picture Ref1 because the reference picture Ref1 is an intra coded picture or the following picture (Step S3), while it does not calculate the differential value when the equation (A) is not satisfied.

Next, the motion estimation unit 101 performs the processing for the above-mentioned reference picture Ref1 respectively for the reference picture Ref2 stored in the memory 409 and the reference picture Ref3 stored in the memory 410 in the same manner (Step S1~Step S3).

Next, the motion estimation unit 101 determines a reference picture whose inter picture differential value is smallest from among the reference pictures whose differential values have been calculated as above (Step S4). Then, the motion estimation unit 101 outputs the information for identifying the determined reference picture as motion information MV, and, at the same time, outputs a reference picture instruction signal RefFrm that is a switching instruction signal so that the selection unit 402 can select the determined reference picture to output it as a reference picture Ref (Step S5).

Note that a reference picture whose inter picture differential value is smallest may be determined in Step S4 after the reference pictures whose differential values have been calculated in Step S3 so as to repeat Step S1, Step S2, Step S3 and Step S4 for the memories 408~410 respectively.

On the other hand, upon receipt of the picture signal Vin, the subtraction unit 403 calculates a difference between this picture signal Vin and the reference picture Ref selected by the selection unit 402, and outputs a differential picture signal Dif to the coding unit 404. Next, the coding unit 404 codes the differential picture signal Dif and the motion information MV outputted from the motion estimation unit 101 to output a coded picture signal Str and coded data Coded.

The decoding unit 405 decodes the coded data Coded and outputs the reconstructed differential picture signal RecDif to the addition unit 406. The addition unit 406 adds the reconstructed differential picture signal RecDif and the reference picture Ref selected by the selection unit 402, and outputs the decoded picture signal Recon to the selection unit 407. The selection unit 407 outputs the decoded picture signal Recon to any of the memories 408~410 as a decoded picture signal Rec1, a decoded picture signal Rec2 or a decoded picture signal Rec3 so as to enable the decoded picture signal Recon to be referred to for coding the following pictures.

Figure 1:
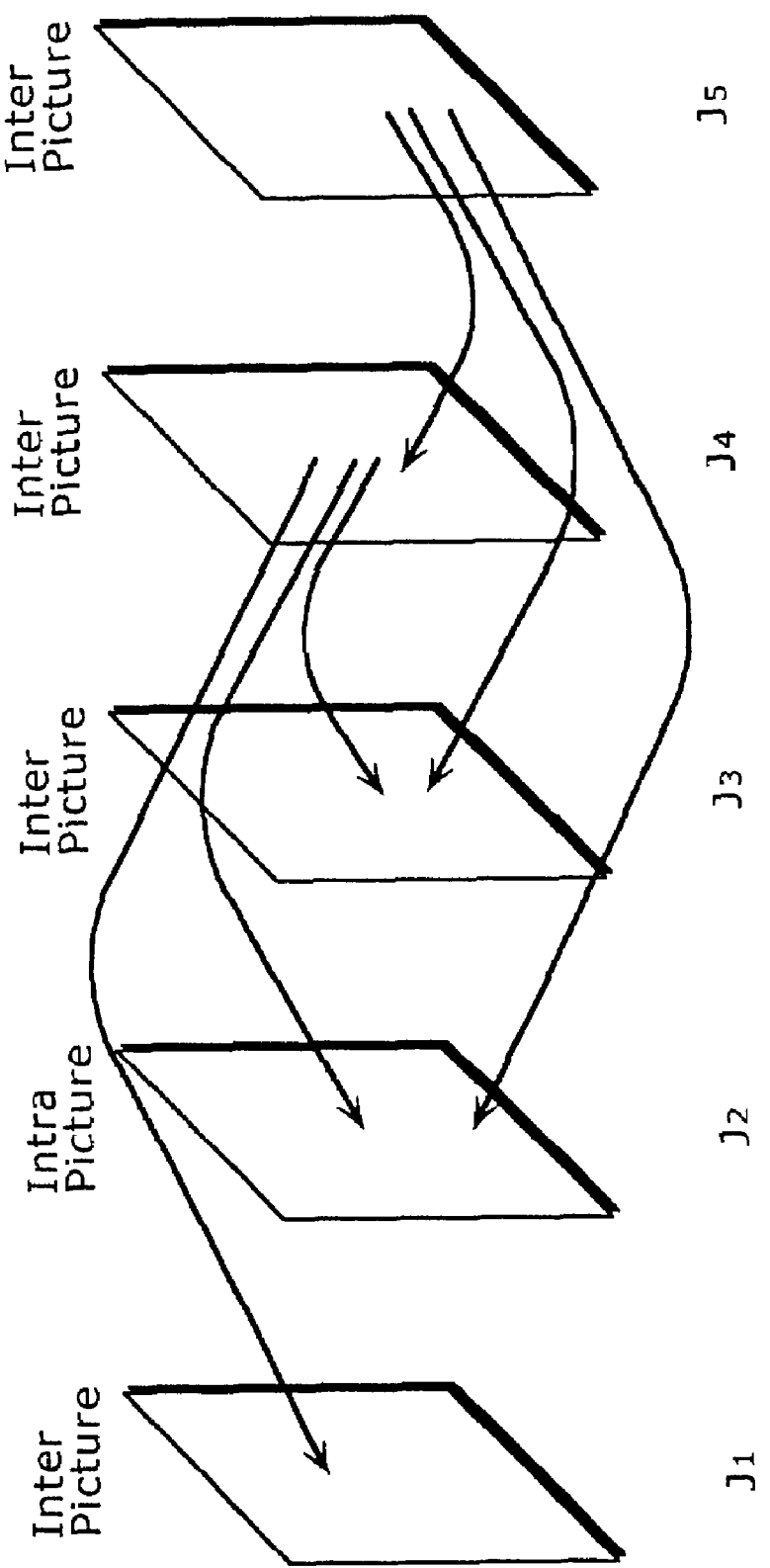
FIG. 1 is an illustration of a concept of a conventional moving picture coding method and moving picture decoding method.
Figure 6:
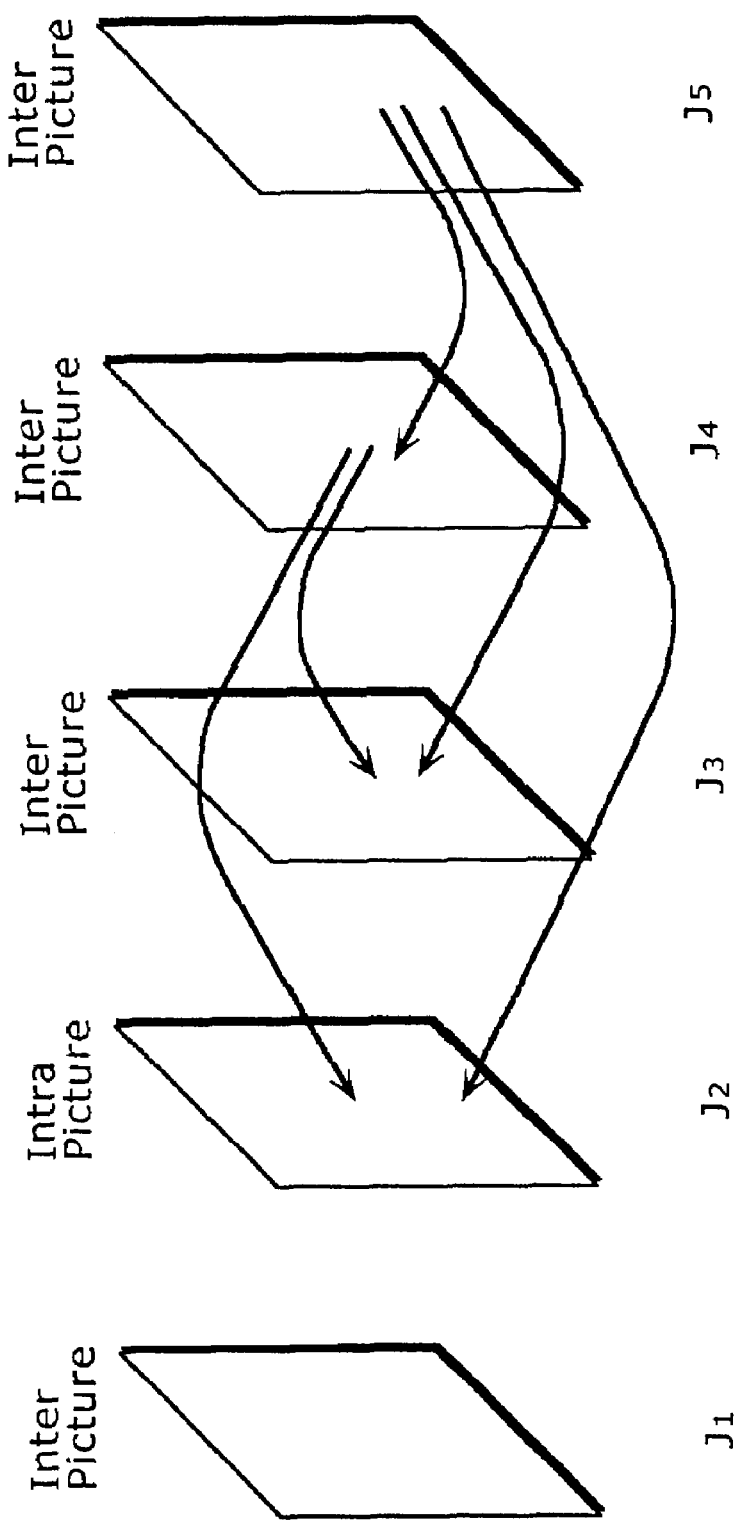
FIG. 6 is an illustration showing pictures which can be selected as reference pictures for coding pictures in the above embodiment.

FIG. 6 is an illustration showing pictures which can be selected as reference pictures for coding pictures. As is the case of FIG. 1, Picture $J_2$ is an intra coded picture, and Picture $J_1$, Picture $J_3$, Picture $J_4$ and Picture $J_5$ are inter coded pictures. The coding order in a bit stream is Picture $J_1$, Picture $J_2$, Picture $J_3$, Picture $J_4$ and Picture $J_5$.

As mentioned above, when inter picture coding is performed under the operation of the moving picture coding apparatus 1, for example, when Picture $J_5$ is coded as shown In FIG. 6, Picture $J_2$, Picture $J_3$ and Picture $J_4$ can be selected as reference pictures. Also, when Picture J4 is coded, only Picture $J_2$ and Picture $J_3$ can be referred to because Picture $J_1$ preceding the intra coded Picture $J_2$ is disabled for coding.

As described above, since pictures are coded using only an intra coded picture and pictures which have been coded following the intra coded picture as reference pictures, reproduction can be started from the intra coded picture at some midpoint of a coded picture signal. Also, even if an error occurs in a stream, a coded picture signal Str, that is, a stream which can be reproduced without error following the intra coded picture, can be generated.

In order to start reproduction at some midpoint of a picture signal recorded on a DVD or a hard disk, a mechanism for the midpoint reproduction is required, so Reset is instructed at the picture from which reproduction is to be started. This Reset instruction may be determined and made by an operator when coding pictures, or at every predetermined picture cycle or time lapse.

Figure 7:
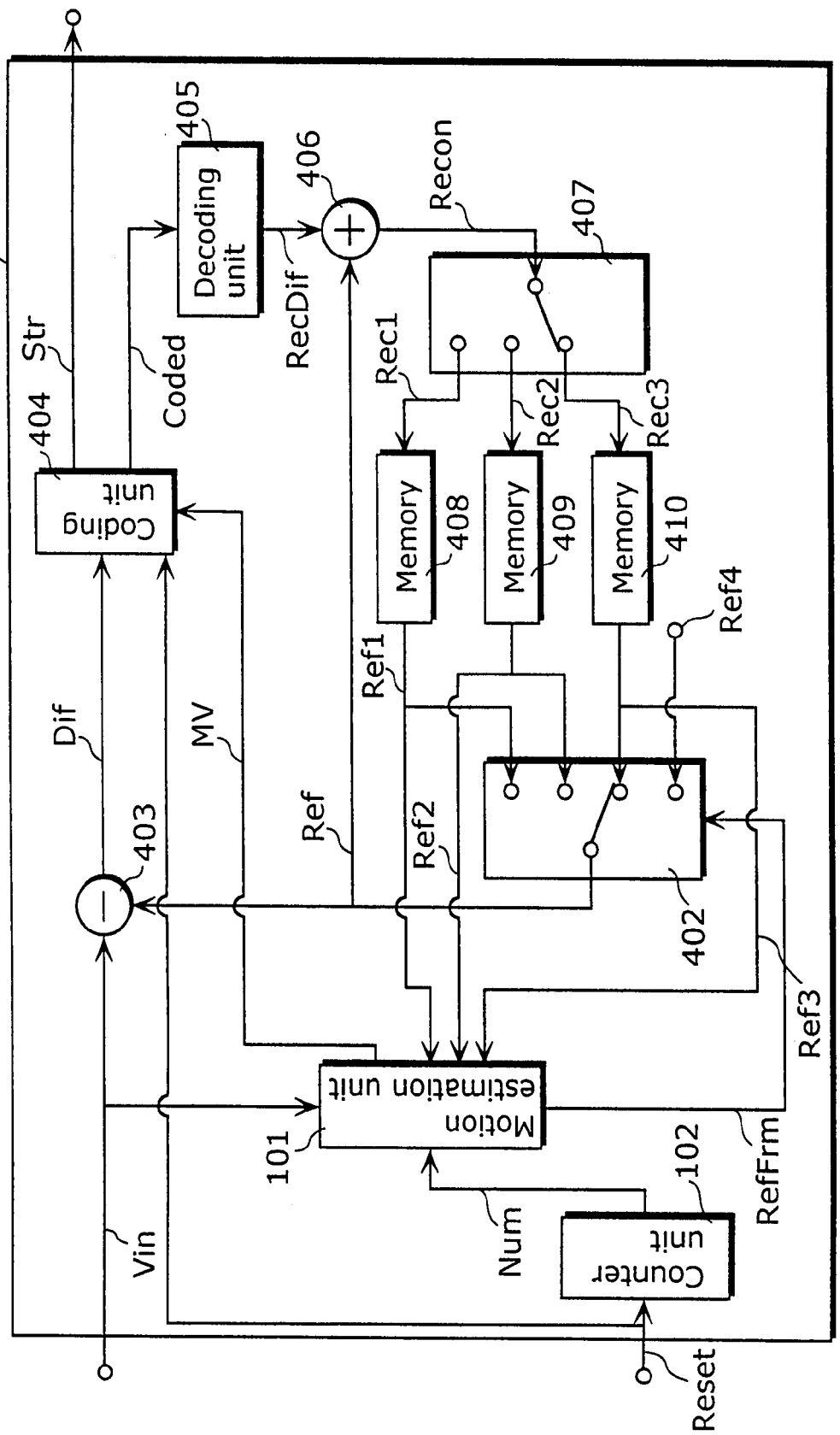
FIG. 7 is a block diagram showing another example of the moving picture coding apparatus of the first embodiment according to the present invention.

Note that each picture has the information on whether the picture is intra coded or inter coded as auxillary information. So, a signal, indicating that the intra coded picture which has been explained in the above first embodiment is specified by an intra picture coding instruction signal Reset, may also be coded (FIG. 7). Specifically, if this is the intra coded picture specified by this intra picture coding instruction signal Reset, it may be designed so that pictures stored in a memory prior to this specified picture are not referred to.

Or, it means here that pictures stored in a memory prior to an intra coded picture are not referred to, with the intra coded picture set as the anchor picture, but the pictures stored in the memory prior to the intra coded picture may be deleted from the memory, with the intra coded picture set as the anchor picture.

In addition, an intra picture coding instruction signal Reset, which indicates that pictures stored in a memory prior to an intra coded picture are not referred to, is coded here, but in order to delete the pictures stored prior to the intra coded picture from the memory, a control command other than this intra picture coding instruction signal Reset may be coded.

Figure 3:
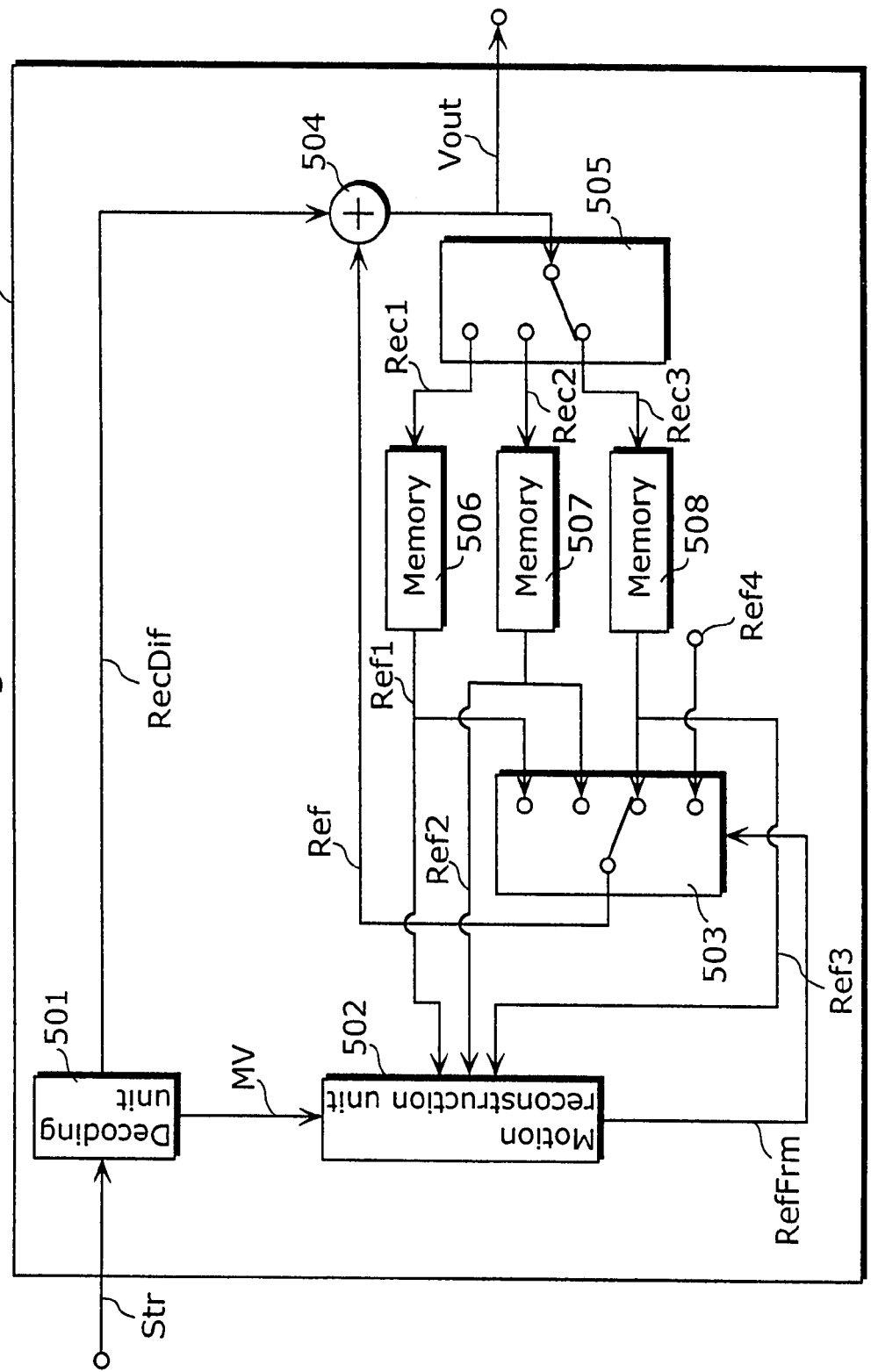
FIG. 3 is a block diagram showing a structure of a conventional moving picture decoding apparatus.

FIG. 8 is a block diagram showing the structure of a moving picture decoding apparatus of the first embodiment according to the present invention. Note that the same signs are assigned to the units which operate in the same manner as the units in the conventional moving picture decoding apparatus 5 as shown in FIG. 3.

The moving picture decoding apparatus 2 is an apparatus for decoding a coded picture signal Str which is coded by the moving picture coding apparatus as shown in the above first embodiment, and is comprised of a decoding unit 201, a motion reconstruction unit 202, the selection unit 503, the addition unit 504, the selection unit 505, the memories 506~508, and a counter unit 203.

The decoding unit 201 decodes the inputted coded picture signal Str, and outputs a reconstructed differential picture signal RecDif, motion information MV and an intra picture coding Instruction signal Reset. Upon receipt of the instruction of intra picture coding by the intra picture coding instruction signal Reset, the counter unit 203 starts counting the number of pictures following an intra coded picture, and notifies the motion reconstruction unit 202 of the result as the number of potential reference pictures Num.

The motion reconstruction unit 202 decodes the motion information MV, judges based on the number of potential reference pictures whether a reference picture indicated by this motion information MV is a picture which can be referred to or not, and determines the reference picture.

The selection unit 503 selects one picture from among the reference picture Ref1, the reference picture Ref2 and the reference picture Ref3 stored in the memories 506~508 based on a reference picture instruction signal RefFrm that is a switching instruction signal, and outputs the picture as a reference picture Ref. The addition unit 504 adds the reconstructed differential picture signal RecDif and the reference picture Ref to output a decoded picture signal Vout1 (which corresponds to a decoded picture signal Recon in FIG. 4).

The selection unit 505 outputs the inputted decoded picture signal Vout1 to any of the memories 506~508 as the decoded picture signal Rec1, the decoded picture signal Rec2 or the decoded picture signal Rec3 in order to enable the decoded picture signal Vout1 to be referred to as a reference picture when decoding the following pictures. In the present embodiment, the selection unit 505 switches the memories so that a picture which has been stored in any of these memories at the earliest time is overwritten by a new decoded picture signal Recon.

Next, the operation of the moving picture decoding apparatus structured as mentioned above will be explained.

FIG. 9 is a flowchart showing the operation of the motion reconstruction unit 202.

The coded picture signal Str is inputted to the decoding unit 201. The decoding unit 201 decodes the inputted coded picture signal Str and outputs a reconstructed differential picture signal RecDif and motion information MV. Also, when the inputted coded picture signal Str is an intra coded picture, the decoding unit 201 outputs an intra picture coding instruction signal Reset.

Upon receipt of the intra picture coding instruction signal Reset from the decoding unit 201, the counter unit 203 starts calculating the number of pictures following the intra coded picture, and notifies the motion reconstruction unit 202 of the result as the number of potential reference pictures Num.

Upon receipt of the motion information MV and the number of potential reference pictures Num, the motion reconstruction unit 202 identifies the reference picture which has been referred to for coding based on the motion Information MV that is the information for identifying a reference picture (Step S11). Next, the motion reconstruction unit 202 judges whether or not this reference picture is an intra decoded picture or one of the following pictures. Specifically, it judges using an equation (B), for example, based on the picture number specific to each picture and the number of potential reference pictures which is notified from the counter unit 203 (Step S12).

Picture number of a reference picture≧Picture number of coded picture signal $Str$–Number of potential reference pictures $Num$     (B)

As a result, since the reference picture is an intra decoded picture or one of the following pictures when the above equation (B) is satisfied, the motion reconstruction unit 202 selects the reference picture identified based on the motion information MV as a reference picture used for decoding (Step S13).

On the other hand, when the equation (B) is not be satisfied, the reference picture is an intra decoded picture. Basically, pictures must have been coded with reference only to an intra coded picture or the following pictures. Therefore, the reference picture necessary for decoding which has been identified based on the motion information MV should be an intra decoded picture or one of pictures which have been decoded following the intra decoded picture and obtained based on the number of potential reference pictures. Num. However, there is a possibility that a picture which has been decoded prior to the intra decoded picture is referred to, that is, the above equation (B) is not be satisfied, due to a transmission error or the like. So, the motion reconstruction unit 202 selects a reference picture used for decoding according to any of the following methods 1~3 for predetermining the reference picture in the case when the equation (B) is not be satisfied (Step S14).

Figures 10A, 10B:
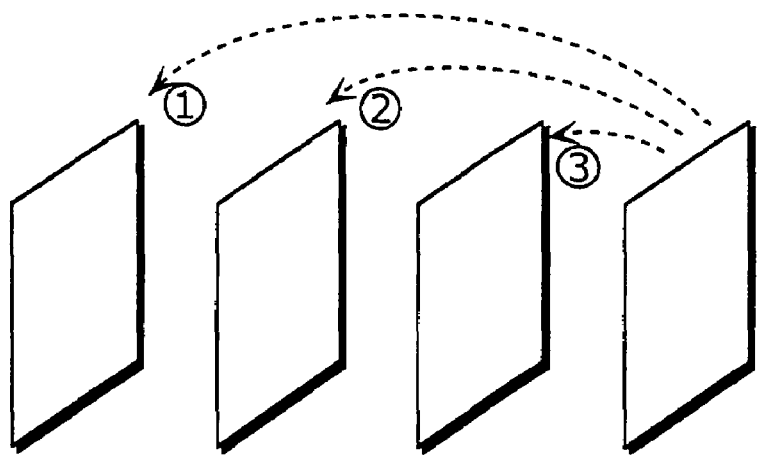
FIG. 10 is an illustration explaining selection of reference 3'pictures used for decoding by methods 1~3 in the above embodiment, and A is an illustration of reference pictures used for decoding, and B is an illustration showing picture location relation.

FIG. 10 is an illustration explaining selection of a reference picture used for decoding by methods 1~3, and A is an illustration of a reference picture used for decoding, and B is an illustration showing picture location relation. This example shows the decoding of Picture $P_4$, and Picture $P_2$ is an intra decoded picture and the other Picture $P_1$, Picture $P_3$ and Picture $P_4$ are inter decoded pictures. In both the display order and decoding start (location in a stream) order, these pictures are ordered, from earliest to latest, in the order of Picture $P_1$, Picture $P_2$, Picture $P_3$ and Picture $P_4$.

(Method 1)

A reference picture (Picture $P_1$) identified based on the motion information MV is selected as a reference picture to be used for decoding as it is. In this case, even if a picture preceding an intra coded picture has been referred to for coding due to error, the picture can be properly decoded if only Picture $P_1$ has been decoded properly.

(Method 2)

An intra decoded picture (Picture $P_2$) is selected as a reference picture to be used for decoding. In this case, since the intra decoded picture is a picture which has been decoded earliest as a reference picture among potential reference pictures, the intra decoded picture has the strongest correlation with a picture preceding itself among the potential reference pictures, and thus there is a high possibility that the picture quality is not degraded even if the reference picture used for coding is a picture which has been decoded prior to the intra decoded picture.

(Method 3)

A picture which has been decoded most recently (Picture $P_3$) is selected as a reference picture to be used for decoding. Generally, picture signals have stronger correlation with each other if the time interval between them is shorter, and, as a result, there is a very high possibility that the picture which has been decoded most recently is to be a reference picture. Therefore, the most recently decoded picture with the strongest correlation is most likely to be a proper reference picture if a wrong reference picture is identified based on the motion information MV, and thus there is a high possibility that the picture quality is not degraded.

Note that any one of these methods 1~3 may be used, or a combination of two or more methods may be used. As an example of such a combination, when in the method 1, the reference picture (Picture $P_1$) identified based on the motion information MV cannot be selected as a reference picture to be used for decoding as it is, default processing may be performed for selecting the picture decoded most recently, as shown in the method 3, as a reference picture to be used for decoding, for example.

Next, the motion reconstruction unit 202 reads out in sequence the reference picture Ref1, reference picture Ref2 and reference picture Ref3 stored in the memories 506~508, and judges whether they are the reference pictures selected as mentioned above or not (Step S15 in FIG. 9). In other words, it identifies the memory storing the selected reference picture among the memories 506~508. Then, the motion reconstruction unit 202 outputs a reference picture instruction signal RefFrm that is a switching instruction signal so that the selection unit 503 can select for outputting the identified reference picture Ref1, reference picture Ref2 or reference picture Ref3 as a reference picture Ref (Step S16 in FIG. 9).

The addition unit 504 adds the reference picture Ref and the reconstructed differential picture signal RecDif outputted from the decoding unit 201, and outputs a decoded picture signal Vout1 (which corresponds to a decoded picture signal Recon in FIG. 4) to the selection unit 505. The selection unit 505 outputs the inputted decoded picture signal Vout1 to any of the memories 506~508 as a decoded picture signal Rec1, decoded picture signal Rec2 or decoded picture signal Rec3, so as to enable the decoded picture signal Vout1 to be referred to as a reference picture when decoding the following pictures.

As described above, a coded picture signal Str which has been coded with reference only to an intra decoded picture or pictures following the intra decoded picture as reference pictures can be properly decoded to obtain a decoded picture signal Vout1, and thus reproduction can be started from the intra coded picture at some midpoint of a coded picture signal. Also, even if an error occurs in a stream, pictures following the intra coded picture can be reproduced without error.

Note that in the present embodiment, the methods 1~3 are predetermined for selecting a reference picture to be used by the motion reconstruction unit 202 for decoding, but the present invention is not limited to these methods. These three methods or two of them may be dynamically switched according to the situation, in such a way that, for example, the method 3 is used when the picture number identified based on motion information MV is quite different from the potential reference picture numbers, the method 1 is used when the picture identified based on the motion information MV is stored in a memory and can be referred to, and the method 2 is used in other cases.

Also, each picture has the information on whether the picture is to be intra decoded or inter decoded as auxiliary information. So, the coded picture signal Str, Including a signal indicating that the intra coded picture which has been explained in the above first embodiment is specified by an intra picture coding instruction signal Reset, may be received, and that signal indicating the picture specified by the intra picture coding instruction signal Reset may be decoded. Specifically, if a picture is an intra coded picture specified by this intra picture coding instruction signal Reset, it may be designed so that pictures stored in a memory prior to this specified picture are not referred to.

Or, it means here that pictures stored in a memory prior to an intra coded picture are not referred to, with the intra decoded picture set as the anchor picture, but pictures stored in a memory prior to the intra decoded picture may be deleted from the memory, with the intra decoded picture set as the anchor picture.

In addition, in order to delete the pictures stored prior to the intra coded picture from the memory, it may be designed so as to receive a coded picture signal Str including a control command other than this intra picture coding instruction signal Reset, decode this control command, judge whether or not this control command is received along with the signal indicating the picture specified by the intra picture coding instruction signal Reset, and perform error control.

Second Embodiment

Next, a moving picture decoding apparatus of a second embodiment of the present invention will be explained.

Figure 11:
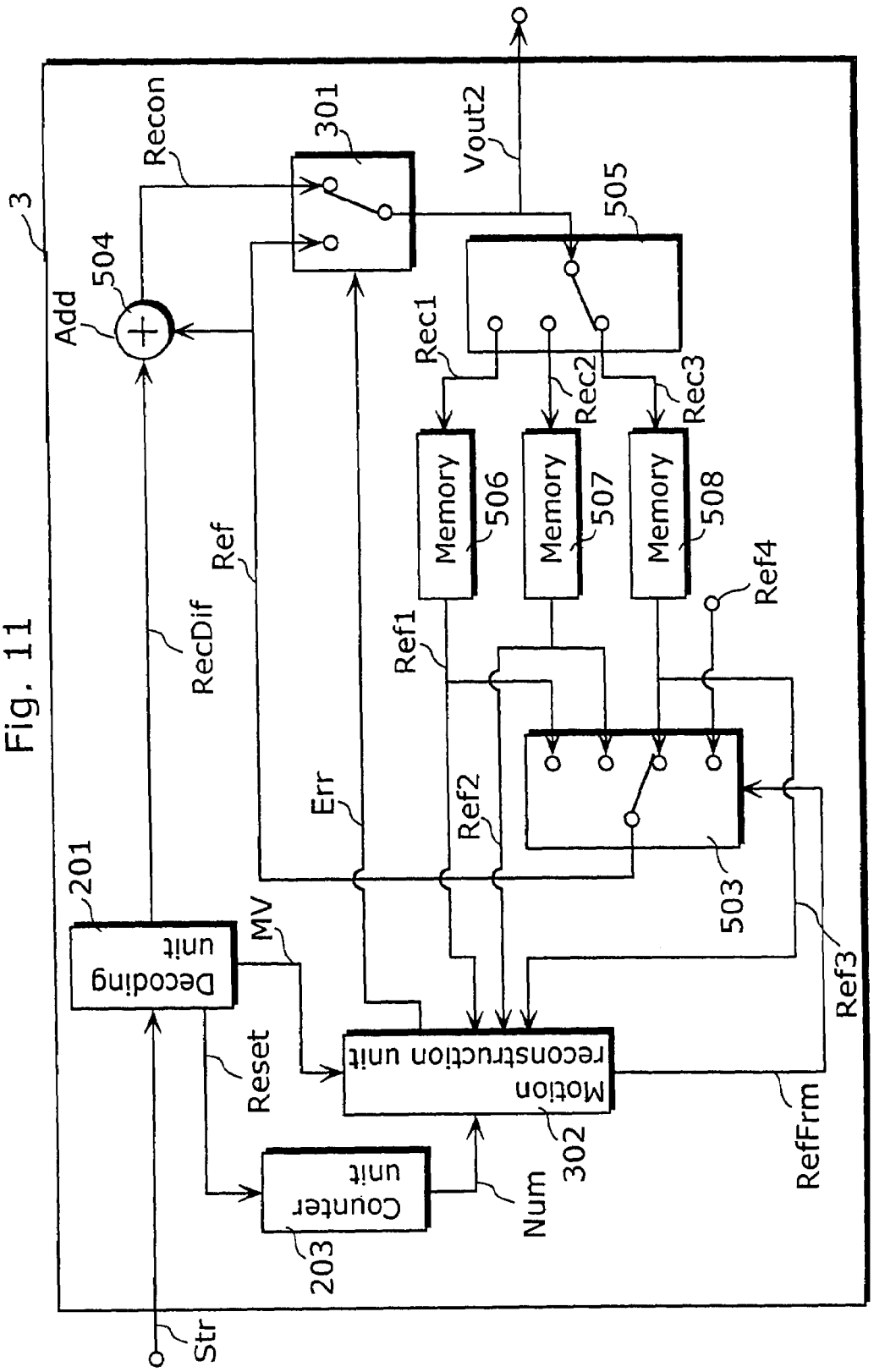
FIG. 11 is a block diagram showing a structure of a moving picture decoding apparatus of a second embodiment according to the present invention.

FIG. 11 is a block diagram showing the structure of the moving picture decoding apparatus of the second embodiment according to the present invention. Note that the same signs are assigned to the units which operate in the same manner as those of the moving picture decoding apparatus 2 as shown in FIG. 8.

A moving picture decoding apparatus 3 includes a selection unit 301 in addition to the units of the moving picture decoding apparatus 2 as shown in FIG. 8, and it is different from the first embodiment in its operation in the case where a reference picture identified by motion information MV is a picture which has been decoded prior to an intra decoded picture due to transmission error or the like.

The selection unit 301 outputs either a decoded picture signal Recon outputted from the addition unit 504 or a reference picture Ref outputted from the selection unit 503 as a decoded picture signal Vout2, based on an error notice signal Err notified from a motion reconstruction unit 302.

Next, the operation of the moving picture decoding apparatus structured as mentioned above will be explained, but the explanation of the portions same as the above first embodiment will be omitted.

Figure 12:
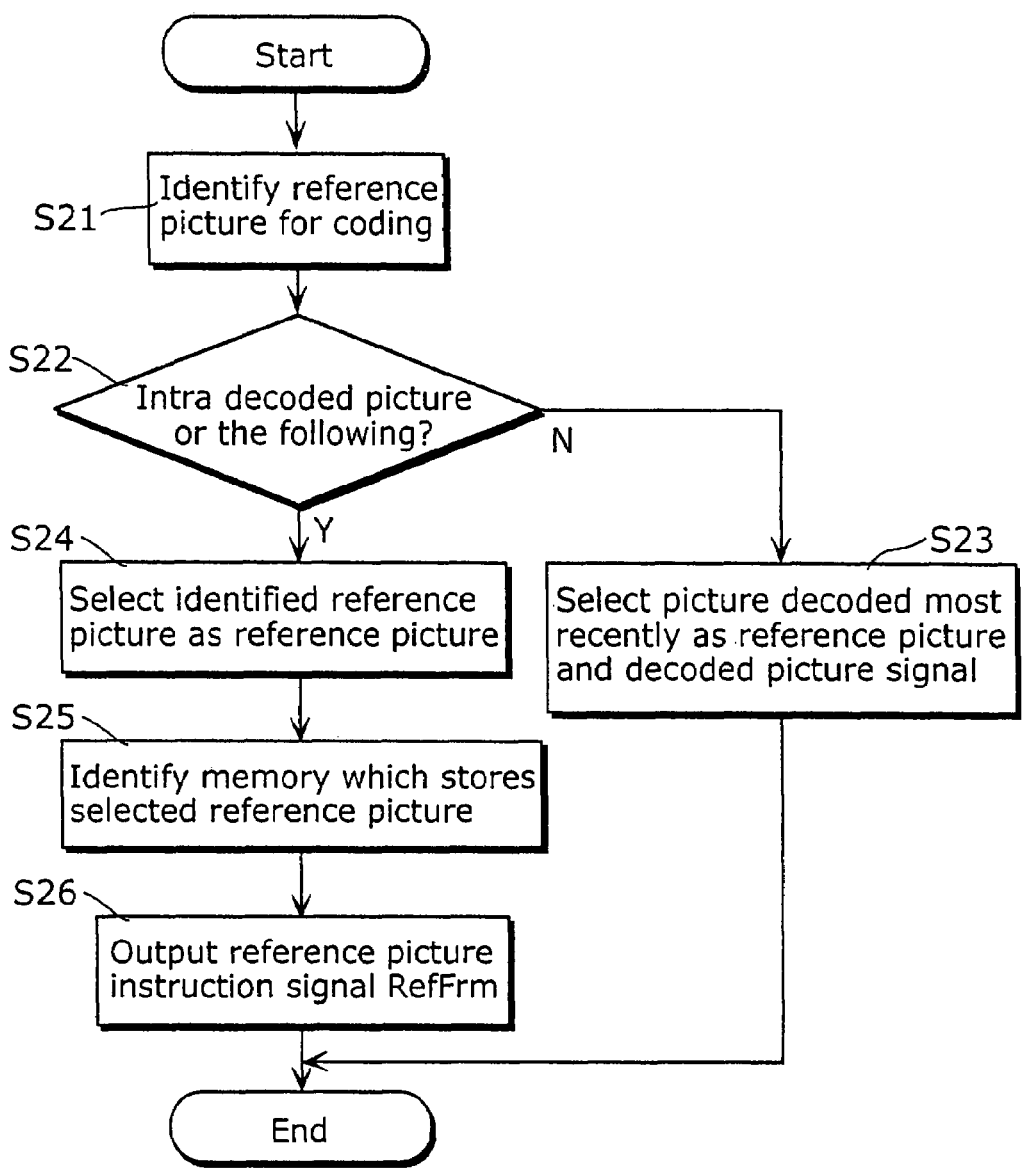
FIG. 12 is a flowchart showing operation of a motion reconstruction unit in the above embodiment.

FIG. 12 is a flowchart showing the operation of the motion reconstruction unit 302.

The operation in Steps S21~S22 as shown in FIG. 12 is same as the operation in Steps S11~S12 as shown in FIG. 9. Next, as a result of judging whether the identified reference picture is an intra decoded picture or one of the following pictures or not, if the above equation (B) is not satisfied, that is, the reference picture is a picture which has been decoded prior to the intra decoded picture, the motion reconstruction unit 302 sends an error notice signal Err to the selection unit 301 to notify it of an error. The motion reconstruction unit 302 also selects the picture decoded most recently as a reference picture and a decoded picture signal (Step S23). In other words, when receiving the error notice signal Err, the selection unit 301 outputs a reference picture Ref as a decoded picture signal Vout2, so selecting the picture decoded most recently as a reference picture means selecting the picture decoded most recently as a decoded picture signal.

On the other hand, when the above equation (B) is satisfied as a result of the above judgment, the reference picture is an intra decoded picture or one of the following pictures, so the motion reconstruction unit 302 selects, in the same manner as the above first embodiment, a reference picture identified based on the motion information MV as a reference picture used for decoding (Step S24).

The operation in the next Steps S25~S26 as shown in FIG. 12 is same as the operation in the Steps S15~S16 as shown in FIG. 9.

Next, the addition unit 504 adds the reference picture Ref and the reconstructed differential picture signal RecDif outputted from the decoding unit 201 to output a decoded picture signal Recon. When the error notice signal Err is not notified from the motion reconstruction unit 302, the selection unit 301 outputs the decoded picture signal Recon outputted from the addition unit 504 as a decoded picture signal Vout2, and when the error notice signal Err is notified, it outputs the reference picture Ref outputted from the selection unit 503 as a decoded picture signal vout2. In sum, when the error notice signal Err is notified, it outputs the picture decoded most recently as it is as a decoded picture signal Vout2.

The selection unit 505 outputs the inputted decoded picture signal Vout2 to any of the memories 506~508 as a decoded picture signal Rec1, a decoded picture signal Rec2 or a decoded picture signal Rec3 so as to enable the decoded picture signal Vout2 to be referred to as a reference picture when decoding the following pictures.

As described above, even if a picture preceding an intra decoded picture is referred to due to a transmission error or the like, a reference picture Ref that is the picture decoded most recently with the strongest pixel correlation is outputted as a decoded picture signal Vout2, so the influence on picture degradation due to such an error can be minimized.

Note that in each of the above embodiments, the maximum of 3 coded pictures can be referred to because: the number of memories is 3, but the present invention is not limited to that number, but coding and decoding can be performed with reference to more coded pictures with the increase of the number of memories.

Also, in each of the above embodiments, motion compensation units not shown in the figures are respectively provided on the output sides of the selection unit 402 and the selection unit 503 of the moving picture coding apparatus 1 and the moving picture decoding apparatuses 2 and 3, for performing motion compensation, that is, compensation of pixel motion between pictures.

In addition, in each of the above embodiments, reference pictures are limited for inter picture coding, so that any pictures which have been coded prior to an intra coded picture, if any, are not referred to as reference pictures, but the present invention is not limited to that. For example, it is also possible not to limit reference pictures so that any pictures decoded prior to an intra coded picture are not referred to as reference pictures. In other words, it is possible to provide another type of an intra coded picture so that the pictures coded prior to the intra coded picture can be referred to as reference pictures, as is the case of a traditional method, and use both types of intra coded pictures according to need. In this case, the information for distinguishing two types of intra coded pictures can be stored in header information or the like in a coded picture signal Str, for example.

Further, in each of the above embodiments, the counter unit 102 or 203 may count in picture display order, not in picture coding or decoding order.

Third Embodiment

In addition, if a program for realizing the structure of the picture coding method or the picture decoding method as shown in each of the above-mentioned embodiments is recorded on a storage medium such as a flexible disk, it becomes possible to perform the processing as shown in each of the above embodiments easily in an independent computer system.

FIG. 13 is an illustration showing the implementation by a computer system using a flexible disk which stores the picture coding method or the picture decoding method in the above-mentioned first and second embodiments.

Figure 13A:
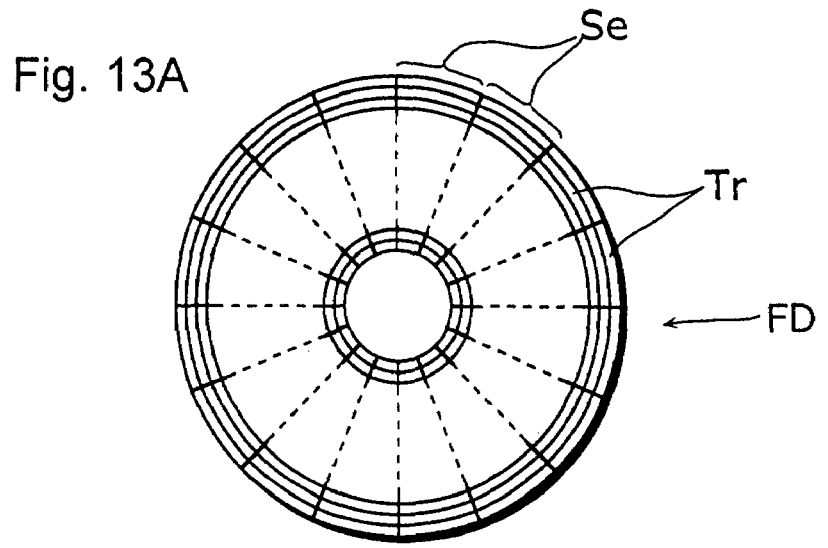
FIG. 13 is an illustration of a recording medium for storing a program for realizing the moving picture coding method and the moving picture decoding method of the above-mentioned first embodiment and the second embodiment by a computer system. A is an illustration showing an example of a physical format of a flexible disk that is the recording medium main body, B is an illustration showing the front view of the appearance of the flexible disk, the cross-sectional view thereof and the flexible disk, and C is an illustration showing the structure for recording and reproducing the above program on the flexible disk FD.
Figure 13B:
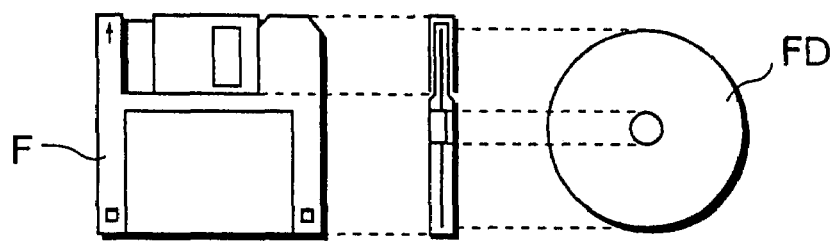

FIG. 13B shows the front view and the cross-sectional view of the appearance of a flexible disk, and the flexible disk, and FIG. 13A shows an example of a physical format of a flexible disk as a recording medium itself. A flexible disk FD is contained in a case F, a plurality of tracks Tr are formed concentrically on the surface of the disk in the radius direction from the periphery, and each track is divided into 16 sectors Se in the angular direction. Therefore, as for the flexible disk storing the above-mentioned program, the picture coding method and the picture decoding method as the above program are recorded in an area allocated for it on the flexible disk FD.

Figure 13C:
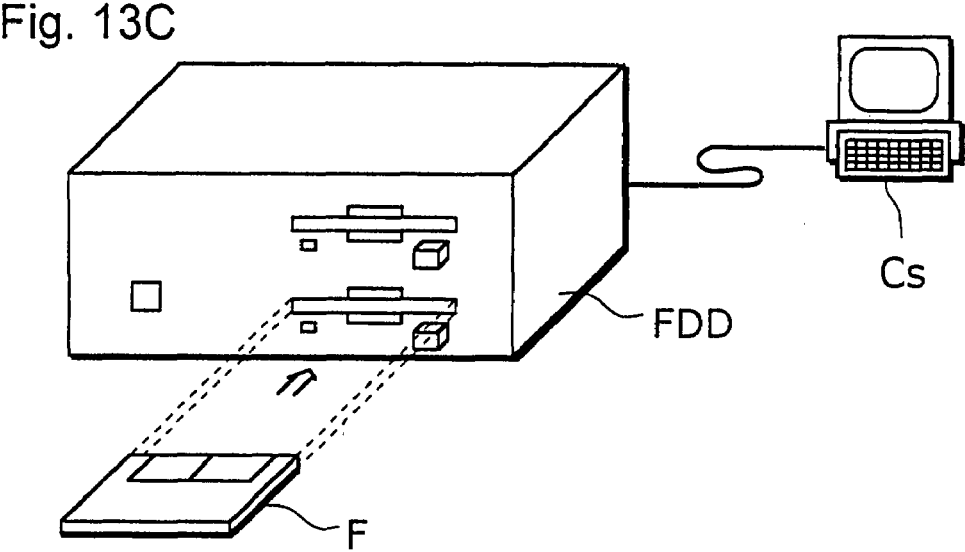

FIG. 13C shows the structure for recording and reproducing the program on and from the flexible disk FD. For recording the program on the flexible disk FD, the computer system Cs writes the picture coding method or the picture decoding method as the program on the flexible disk FD via a flexible disk drive FDD. For constructing the above picture coding method and the picture decoding method in the computer system by the program recorded on the flexible disk, the program is read out from the flexible disk FD via the flexible disk drive FDD and transferred to the computer system.

Note that the above explanation is made on the assumption that a recording medium is a flexible disk, but the same processing can also be performed using an optical disk. In addition, the recording medium is not limited to these, but any other mediums such as an IC card and a ROM cassette can be used in the same manner if a program can be recorded on them.

Further, the applications of the moving picture coding method and the moving picture decoding methods as shown in the above embodiments and a system using them will be explained here.

Figure 14:
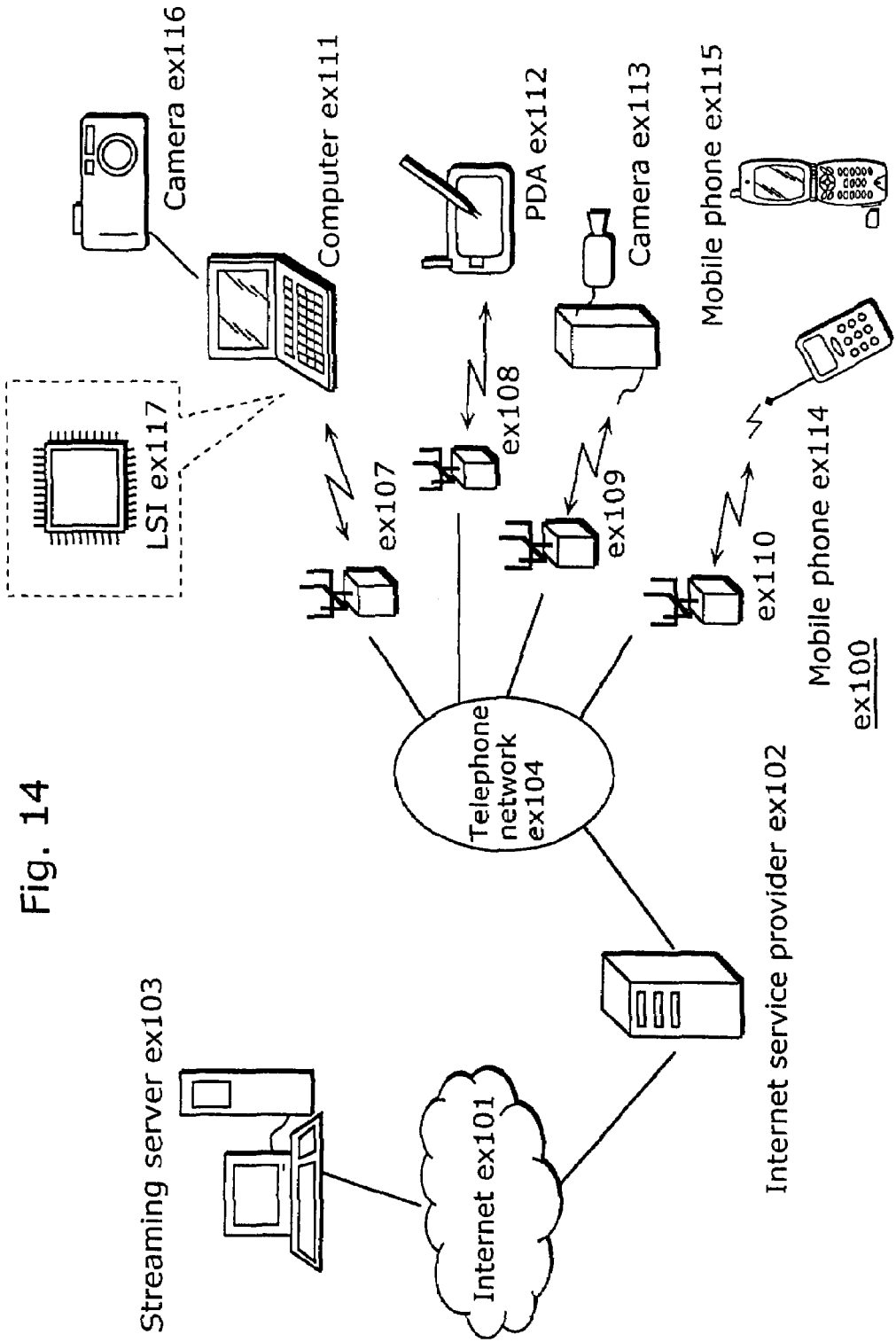
FIG. 14 is a block diagram showing an overall configuration of a content providing system which realizes content distribution services.

FIG. 14 is a block diagram showing the overall configuration of a content providing system ex100 for realizing content distribution service. The area for providing communication service is divided into cells of desired size, and base stations ex107~ex110 which are fixed wireless stations are placed in respective cells.

This content providing system ex100 is connected to various devices such as a computer ex111, a PDA (personal digital assistant) ex112, a camera ex113, a mobile phone ex114 and a camera-equipped mobile phone ex115 via the Internet ex101, an Internet service provider ex102, a telephone network ex104 and base stations ex107~ex110, for example.

However, the content providing system ex100 is not limited to the combination as shown in FIG. 14, and may be connected to a combination of any of them. Also, each device may be connected directly to the telephone network ex104, not through the base stations ex107~ex110 which are the fixed wireless stations.

The camera ex113 is a device such as a digital video camera capable of shooting moving pictures. The mobile phone may be any of a mobile phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) and the like.

Also, a streaming server ex103 is connected to the camera ex113 via the base station ex109 and the telephone network ex104, which enables live distribution or the like using the camera ex113 based on the coded data transmitted from the user. Either the camera ex113 or the server for transmitting the data may code the data shot by the camera. Also, the moving picture data shot by a camera ex116 may be transmitted to the streaming server ex103 via the computer ex111. The camera ex116 is a device such as a digital camera capable of shooting still and moving pictures. In this case, either the camera ex116 or the computer ex111 may code the moving picture data. An LSI ex117 included in the computer ex111 or the camera ex116 performs coding processing. Note that software for coding and decoding pictures may be integrated into any type of a storage medium (such as a CD-ROM, a flexible disk and a hard disk) that is a recording medium which can be read by the computer ex111 or the like. Furthermore, the camera-equipped mobile phone ex115 may transmit the moving picture data. This moving picture data is the data coded by the LSI included in the mobile phone ex115.

In this content providing system ex100, contents (such as a music live video) shot by users using the camera ex113, the camera ex116 or the like are coded in the same manner as the above embodiments and transmitted to the streaming server ex103, while the streaming server ex103 makes stream distribution of the above content data to the clients at their request. The clients include the computer ex111 the PDA ex112, the camera ex113, the mobile phone ex114 and so on capable of decoding the above-mentioned coded data. The content providing system ex100 is a system in which, the clients can thus receive and reproduce the coded data, and further can receive, decode and reproduce the data in real time so as to realize personal broadcasting.

When each device in this system performs coding or decoding, the moving picture coding apparatus or the moving picture decoding apparatus as shown in each of the above-mentioned embodiments may be used.

A mobile phone will be explained as an example thereof.

Figure 15:
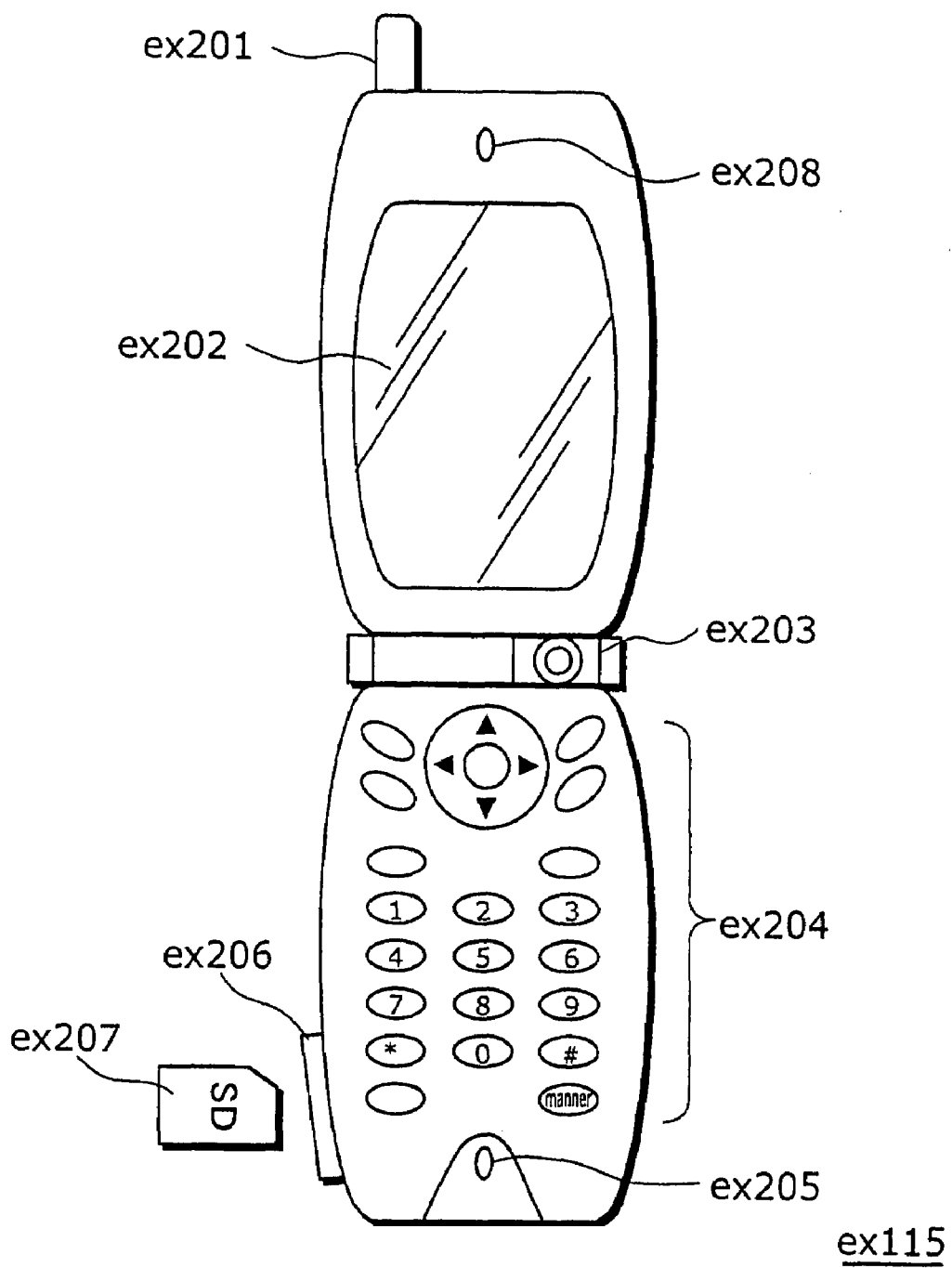
FIG. 15 is a diagram showing an example of a mobile phone.

FIG. 15 is a diagram showing a mobile phone ex115 which uses the moving picture coding method and the moving picture decoding method as explained in the above embodiments. The mobile phone ex115 has an antenna ex201 for sending and receiving radio waves between the base station ex110, a camera unit ex203 such as a CCD camera capable of shooting video and still pictures, a display unit ex202 such as a liquid crystal display for displaying the data obtained by decoding video shot by the camera unit ex203, video received by the antenna ex201, or the like, a main body including a set of operation key s ex204, a voice output unit ex208 such as a speaker for outputting voices, a voice Input unit ex205 such as a microphone for inputting voices, a storage medium ex207 for storing coded or decoded data, such as data of moving or still pictures shot by the camera, and data of text, moving pictures or still pictures of received e-mails, and a slot unit ex206 for attaching the storage medium ex207 into the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

Further, the mobile phone ex115 will be explained with reference to FIG. 16. In the mobile phone ex115, a main control unit ex311 for overall controlling each unit of the display unit ex202 and the main body including operation keys ex204 is connected to a power supply circuit unit ex310, an operation input control unit ex304, a picture coding unit ex312, a camera interface unit ex303, an L'CD (Liquid Crystal Display) control unit ex302, a picture decoding unit ex309, a multiplex/demultiplex unit ex308, a record/reproduce unit ex307, a modem circuit unit ex306 and a voice processing unit ex305 to each other via a synchronous bus ex313.

When a call-end key or a power key is turned. ON by a user's operation, the power supply circuit unit ex310 supplies respective units with power from a battery pack so as to activate the camera-equipped digital mobile phone ex115 for a ready state.

In the mobile phone ex115, under the control of the main control unit ex311 including a CPU, ROM, RAM and the like, the voice processing unit ex305 converts the voice signals received by the voice input unit ex205 in conversation mode into digital voice data, the modem circuit unit ex306 performs spread spectrum processing of the digital voice data, and the send/receive circuit unit ex301 performs digital-to-analog conversion and frequency transformation of the data, so as to transmit the result via the antenna ex201. Also, In the mobile phone ex115, the data received by the antenna ex201 in conversation mode is amplified and performed of frequency transformation and analog-to-digital conversion, the modem circuit unit ex306 performs inverse spread spectrum processing of the data, and the voice processing unit ex305 converts it into analog voice data, so as to output the result via the voice output unit ex208.

Furthermore, when transmitting an e-mail in data communication mode, the text data of the e-mail inputted by operating the operation keys ex204 on the main body is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transformation of it, the result is transmitted to the base station ex110 via the antenna ex201.

When picture data is transmitted in data communication mode, the picture data shot by the camera unit ex203 is provided to the picture coding unit ex312 via the camera interface unit ex303. When the picture data is not transmitted, the picture data shot by the camera unit ex203 can also be displayed directly on the display unit 202 via the camera interface unit ex303 and the LCD control unit ex302.

The picture coding unit ex312, including the picture coding apparatus explained in the present invention, compress and codes the picture data provided from the camera unit ex203 by the coding method used for the picture coding apparatus as shown in the above-mentioned embodiments so as to transform it into coded picture data, and sends it out to the multiplex/demultiplex unit ex308. At this time, the mobile phone ex115 sends out the voices received by the voice input unit ex205 during picture pickup by the camera unit ex203 to the multiplex/demultiplex unit ex308 as digital voice data via the voice processing unit ex305.

The multiplex/demultiplex unit ex308 multiplexes the coded picture data provided from the picture coding unit ex312 and the voice data provided from the voice processing unit ex305 by a predetermined method, the modem circuit unit ex306 performs spread spectrum processing of the resulting multiplexed data, and the send/receive circuit unit ex301 performs digital-to-analog conversion and frequency transformation of the result for transmitting via the antenna ex201.

As for receiving data of a moving picture file which is linked to a Website or the like in data communication mode, the modem circuit unit ex306 performs inverse spread spectrum processing of the data received from the base station ex110 via the antenna ex201, and sends out the resulting multiplexed data to the multiplex/demultiplex unit ex308.

In order to decode the multiplexed data received via the antenna ex201, the multiplex/demultiplex unit ex308 demultiplexes the multiplexed data into a coded bit stream of picture data and a coded bit stream of voice data, and provides the coded picture data to the picture decoding unit ex309 and the voice data to the voice processing unit ex305 respectively via the synchronous bus ex313.

Next, the picture decoding unit ex309, including the picture decoding apparatus explained in the present invention, decodes the coded bit stream of the picture data by the decoding method paired with the coding method as shown in the above-mentioned embodiments, so as to generate reproduced moving picture data, and provides this data to the display unit ex202 via the LCD control unit ex302, and thus moving picture data included in a moving picture file linked to a Website, for instance, is displayed. At the same time, the voice processing unit ex305 converts the voice data into analog voice data, and provides this data to the voice output unit ex208, and thus voice data included in a moving picture file linked to a Website, for instance, is reproduced.

Figure 17:
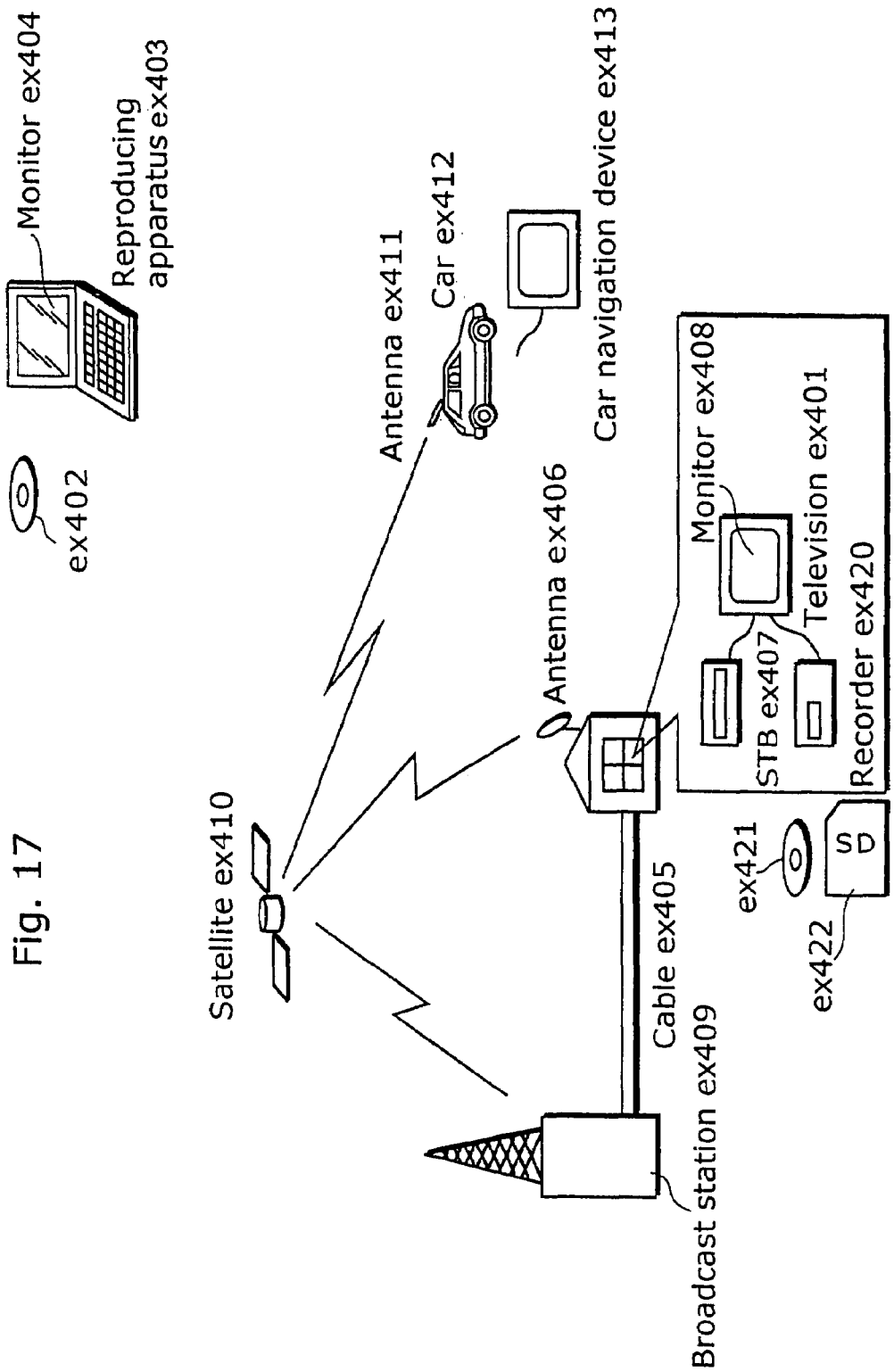
FIG. 17 is a block diagram showing an overall configuration of a digital broadcasting system.

The present invention is not limited to the above-mentioned system. Ground-based or satellite digital broadcasting has been in the news lately, and at least either the picture coding apparatus or the picture decoding apparatus in the above-mentioned embodiments can be incorporated into such a digital broadcasting system as shown in FIG. 17. More specifically, a coded bit stream of video information is transmitted from a broadcast station ex409 to or communicated with a broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 or a set top box (STB) ex407 decodes the coded bit stream for reproduction. The picture decoding apparatus as shown in the above-mentioned embodiments can be implemented in the reproducing apparatus ex403 for reading a coded bit stream recorded on a storage medium ex402 such as a CD and DVD that is a recording medium and decoding it. In this case, the reproduced video signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Or, a car ex412 having an antenna ex411 can receive signals from the satellite ex410, the base station ex107 or the like for reproducing moving pictures on a display apparatus such as a car navigation device ex413 or the like in the car ex412.

Furthermore, the picture coding apparatus as shown in the above-mentioned embodiments can code picture signals for recording them on a recording medium. As a concrete example, there is a recorder ex420 such as a DVD recorder for recording picture signals on a DVD disk ex421 and a disk recorder for recording them on a hard disk. They can also be recorded on an SD card ex422. If the recorder ex420 includes the picture decoding apparatus as shown in the above-mentioned embodiments, the picture signals recorded on the DVD disk ex421 or the SD card ex422 can be reproduced for display on the monitor ex408.

Figure 16:
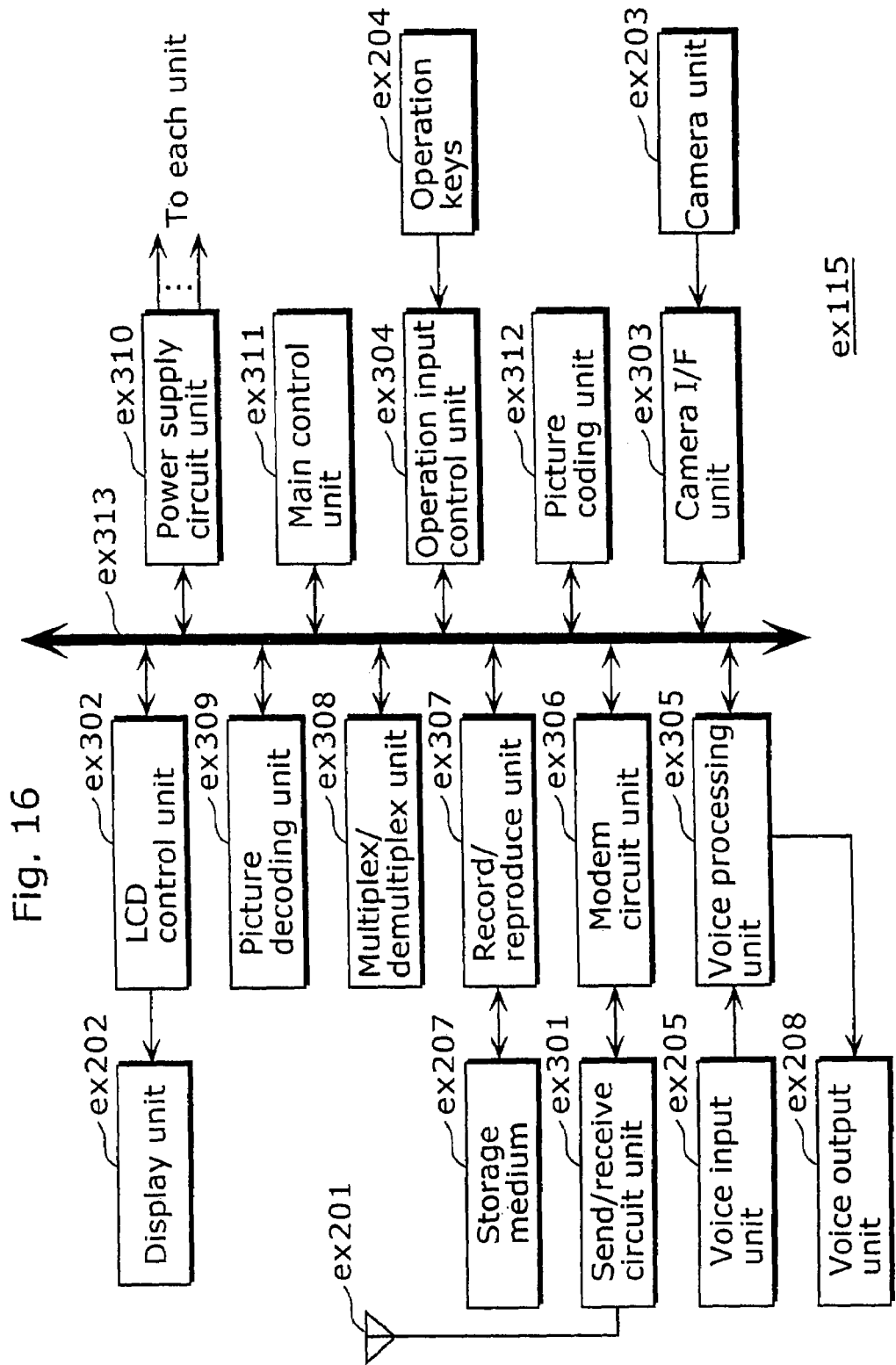
FIG. 16 is a block diagram showing an internal structure of the mobile phone.

Note that as the structure of the car navigation device ex413, the structure without the camera unit ex203, the camera interface unit ex303 and the picture coding unit ex312, out of the units as shown in FIG. 16, is conceivable. The same applies to the computer ex111, the television (receiver) ex401 and others.

In addition, three types of implementations can be conceived for a terminal such as the above-mentioned mobile phone ex114; a sending/receiving terminal equipped with both an encoder and a decoder, a sending terminal equipped with an encoder only, and a receiving terminal equipped with a decoder only.

As described above, it is possible to use the moving picture coding method or the moving picture decoding method as shown in the above embodiments in any of above-mentioned devices and systems, and thus the effects explained in the above embodiments can be obtained.

In addition, the moving picture coding method and the moving picture decoding method as shown in the above-mentioned embodiments are effective when stream data recorded on a storage medium such as a DVD, an SD card and a memory is reproduced at some midpoint of the data.

As is obvious from the above explanation, the moving picture coding method according to the present invention is a method for coding a moving picture on a picture by picture basis, the moving picture coding method comprising: a determining step for determining, as a reference picture, one of an intra coded picture and pictures which have been coded following the intra coded picture, from among a plurality of pictures stored in a memory; a coding step for reading out the determined reference picture from the memory, calculating a differential picture signal that is a difference between the read-out reference picture and a picture to be coded, and coding the calculated differential picture signal; and a storing step for decoding the coded differential picture signal, adding the decoded differential picture signal with a picture signal of the reference picture, and storing a resulting picture in the memory.

Accordingly, since coding is not performed with reference to pictures preceding an intra coded picture as reference pictures, reproduction can be started from the intra coded picture at a midpoint of a coded picture signal. Also, a coded picture signal, that is a stream of pictures which can be reproduced without an error following the intra coded picture even if a stream error occurs, can be generated. As mentioned above, the present invention has strong advantages in midpoint reproduction which is important for storage mediums and error resilience for transmission which is important for wireless and cable transmission.

Also, the moving picture decoding method according to the present invention is a method for decoding a moving picture on a picture by picture basis, the moving picture decoding method comprising: a decoding step for decoding an inputted coded picture signal; a determining step for determining, as a reference picture, one of an intra decoded picture and pictures which have been decoded following the intra decoded picture, from among a plurality of pictures stored in a memory; and a storing step for reading out the determined reference picture from the memory, adding a picture signal of the read-out reference picture with a decoded differential picture signal of a picture to be decoded, and outputting a resulting picture to the outside and storing the resulting picture in the memory.

Accordingly, a coded picture signal, which has been coded with reference only to an intra decoded picture or the following pictures as reference pictures, can be properly decoded to obtain a decoded picture signal, and thus reproduction can be started from the intra coded picture at some midpoint of the coded picture signal. Also, even if an error occurs in a stream, the stream can be reproduced without an error following the intra coded picture.

INDUSTRIAL APPLICABILITY

As described above, the moving picture coding method and the moving picture decoding method according to the present invention are useful for starting reproduction from some midpoint of a stream data recorded on a storage medium such as a DVD, an SD card and a memory used for a mobile phone, a DVD apparatus, a personal computer or the like.

The invention claimed is:

1. A decoding system comprising:

A non-transitory recording medium on which multiplexed data is recorded, the multiplexed data obtained by multiplexing audio data and coded data of a coded moving picture; and a decoding apparatus which reads the multiplexed data from said recording medium and decodes the multiplexed data that has been read, wherein the coded data includes an intra coded picture and an inter coded picture, for the inter coded picture, at least one of the following pictures is selected as a reference picture: the intra coded picture; a picture which is located before the intra coded picture in display order; and a picture located after the intra coded picture in display order, in the case where first information, which indicates that an intra coded picture is a specified picture used for restricting selection of the reference picture, is attached to the intra coded picture, an inter coded picture located after the specified picture in decoding order is coded by selecting, as the reference picture, at least one of the following pictures: the specified picture and a picture which is located after the specified picture in decoding order, in the case where second information, which indicates that an intra coded picture is not the specified picture used for restricting selection of the reference picture, is attached to the intra coded picture, an inter coded picture located after the intra coded picture that is not the specified picture is coded by selecting, as the reference picture, at least one of the following pictures: the intra coded picture that is not the specified picture, a picture located after the intra coded picture that is not the specified picture in decoding order, and a picture located before the intra coded picture that is not the specified picture in decoding order, wherein said decoding apparatus includes:

a decoding unit configured to decode current coded data to be decoded to obtain a decoded picture, and to decode the first information or the second information in the case where the first information or the second information is attached to the current coded data to be decoded;

a specifying unit configured to specify the decoded picture as the specified picture based on the first information in the case where the first information is decoded, and to specify that the decoded picture is not the specified picture based on the second information in the case where the second information is decoded; and an audio decoding unit configured to decode audio data, and wherein, in the case where the decoded picture is specified as the specified picture by said specifying unit, for a picture to be decoded by an inter picture decoding method after the specified picture, at least one of the following pictures is selected as the reference picture: the specified picture and a picture which is decoded after the specified picture in decoding order, while deleting a picture which has been decoded before the specified picture and is stored in the memory so as to prohibit from selecting, as the reference picture, the picture which has been decoded before the specified picture, and in the case where the decoded picture is specified not to be the specified picture by said specifying unit, for a picture to be decoded by an inter picture decoding method after the specified picture, at least one of the following pictures is selected as the reference picture: the decoded picture that is not the specified picture, a picture decoded after the decoded picture that is not the specified picture in decoding order, and a picture decoded before the decoded picture that is not the specified picture in decoding order.

* * * * *